US012425798B2

(12) United States Patent
Ueno

(10) Patent No.: US 12,425,798 B2

(45) **Date of Patent: *Sep. 23, 2025**

(54) NON-TRANSITORY COMPUTER-READABLE MEDIUM HAVING COMPUTER-READABLE INSTRUCTIONS AND SYSTEM

(71) Applicant: Roland Corporation, Shizuoka (JP)

(72) Inventor: Masato Ueno, Shizuoka (JP)

(73) Assignee: Roland Corporation, Shizuoka (JP)

( * ) Notice: Subject to any disclaimer, the term of this patent is extended or adjusted under 35 U.S.C. 154(b) by 55 days.

This patent is subject to a terminal disclaimer.

(21) Appl. No.: 18/611,743

(22) Filed: Mar. 21, 2024

(65) Prior Publication Data

US 2024/0236606 A1 Jul. 11, 2024

Related U.S. Application Data

(63) Continuation of application No. 18/191,878, filed on Mar. 29, 2023, now Pat. No. 11,979,739, which is a (Continued)

(30) Foreign Application Priority Data

Dec. 4, 2019 (JP) ................................ 2019-219985

(51) Int. Cl.
*H04S 7/00* (2006.01)
*H04R 1/10* (2006.01)
(Continued)

(52) U.S. Cl.
CPC ........... *H04S 7/304* (2013.01); *H04R 1/1008* (2013.01); *H04R 1/1041* (2013.01); *H04R 5/033* (2013.01);
(Continued)

(58) Field of Classification Search
CPC .. H04R 1/1008; H04R 1/1041; H04R 1/1091; H04R 5/033; H04R 2201/10;
(Continued)

(56) References Cited

U.S. PATENT DOCUMENTS 5,761,314 A 6/1998 Inanaga et al.
11,979,739 B2 * 5/2024 Ueno .................. G10H 1/0083
(Continued)

FOREIGN PATENT DOCUMENTS

CN 101662720 3/2010

OTHER PUBLICATIONS

"Office Action of China Counterpart Application", issued on Jul. 13, 2024, with English translation thereof, p. 1-p. 16.
(Continued)

*Primary Examiner* — Paul Kim
(74) *Attorney, Agent, or Firm* — JCIPRNET

(57) ABSTRACT

A method of controlling sound signals for mixing a backing sound and a guitar sound. The method includes configuring a user terminal to: receive a first input instruction selected from a plurality of available input instructions, where the plurality of available input instructions include a first instruction to transmit a signal of the backing sound; to provide the signal of the backing sound to a wireless communication device in response to the first input instruction being the first instruction to transmit the signal of the backing sound; and to control the wireless communication device to convert the signal of the backing sound to a first wireless signal and transmit the first wireless signal to a sound output device for mixing the signal of the backing sound and a signal of the guitar sound provided from the sound output device.

19 Claims, 20 Drawing Sheets

Related U.S. Application Data continuation of application No. 17/585,575, filed on Jan. 27, 2022, now Pat. No. 11,647,353, which is a continuation of application No. 17/136,002, filed on Dec. 29, 2020, now Pat. No. 11,272,312, which is a continuation of application No. 17/109,156, filed on Dec. 2, 2020, now Pat. No. 11,277,709.

(51) Int. Cl.
*H04R 5/033* (2006.01)
*H04S 3/00* (2006.01)

(52) U.S. Cl.
CPC .......... *H04S 3/008* (2013.01); *H04R 2420/07* (2013.01); *H04S 2400/01* (2013.01); *H04S 2400/11* (2013.01)

(58) Field of Classification Search
CPC . H04R 2420/01; H04R 2420/07; H04S 7/304; H04S 3/008; H04S 2400/01; H04S 2400/11; H04S 2420/01; G10H 1/0083; G10H 1/0091; G10H 1/02; G10H 3/08; G10H 3/186; G10H 2210/291; G10H 2210/305; G10H 2240/175; G10H 2240/321; G10H 2240/325
USPC .......................................................... 381/303
See application file for complete search history.

(56) References Cited

U.S. PATENT DOCUMENTS

| | | | | |
|---|---|---|---|---|
| 2015/0373477 | A1 | 12/2015 | Norris et al. | |
| 2018/0279045 | A1* | 9/2018 | Kawahashi .......... | H04R 1/1091 |

OTHER PUBLICATIONS

"Office Action of China Counterpart Application", issued on Jan. 8, 2025, with English translation thereof, p. 1-p. 7.

* cited by examiner

| mode | Y initial value (guitar) | Y initial value (audio) | X initial value (guitar) | X initial value (audio) |
|---|---|---|---|---|
| stage | 180° | 180° | 10° | 15° |
| static | 0° | — | 15° | — |
| surround | — | — | — | — |

FIG. 13A

| mode | Z |
|---|---|
| stage | 40 |
| studio | 20 |

FIG. 13B transfer functions adopted according to positions

| table address | X | Y | Z | $H_L(X,Y,Z)$ | $H_R(X,Y,Z)$ |
|---|---|---|---|---|---|
| 0 | 5 | 0 | 20 | $H_L(5,0,20)$ | $H_R(5,0,20)$ |
| 1 | 5 | 3 | 20 | $H_L(5,3,20)$ | $H_R(5,3,20)$ |
| 2 | 5 | 6 | 20 | $H_L(5,6,20)$ | $H_R(5,6,20)$ |
| : | | : | | | |
| 119 | 5 | 357 | 20 | $H_L(5,357,20)$ | $H_R(5,357,20)$ |
| 120 | 10 | 0 | 20 | $H_L(10,0,20)$ | $H_R(10,0,20)$ |
| 121 | 10 | 3 | 20 | $H_L(10,3,20)$ | $H_R(10,3,20)$ |
| 122 | 10 | 6 | 20 | $H_L(10,6,20)$ | $H_R(10,6,20)$ |
| : | | : | | | |
| 239 | 15 | 357 | 20 | $H_L(15,357,20)$ | $H_R(15,357,20)$ |
| 240 | 15 | 0 | 20 | $H_L(15,0,20)$ | $H_R(15,0,20)$ |
| 241 | 15 | 3 | 20 | $H_L(15,3,20)$ | $H_R(15,3,20)$ |
| 242 | 15 | 6 | 20 | $H_L(15,6,20)$ | $H_R(15,6,20)$ |
| : | | : | | | |
| 359 | 15 | 3 | 20 | $H_L(15,357,20)$ | $H_R(15,357,20)$ |
| 360 | 5 | 0 | 40 | $H_L(5,0,40)$ | $H_R(5,0,40)$ |
| 361 | 5 | 3 | 40 | $H_L(5,3,40)$ | $H_R(5,3,40)$ |
| 362 | 5 | 6 | 40 | $H_L(5,6,40)$ | $H_R(5,6,40)$ |
| : | | : | | | |
| | | | | | |
| : | | : | | | |
| 719 | 15 | 357 | 40 | $H_L(15,357,40)$ | $H_R(15,357,40)$ |

FIG. 14 specific example of transfer functions to be adopted

| figure | $H_G(X,Y,Z)$ | | $H_A(X,Y,Z)$ | |
|---|---|---|---|---|
| 1 | $H_{G-L}(15,0,20)$ | $H_{G-R}(15,0,20)$ | $H_{A-L}(10,0,20)$ | $H_{A-R}(10,0,20)$ |
| 2 | $H_{G-L}(15,180,20)$ | $H_{G-R}(15,180,20)$ | $H_{A-L}(10,0,20)$ | $H_{A-R}(10,0,20)$ |
| 3 | $H_{G-L}(10,180,20)$ | $H_{G-R}(10,180,20)$ | $H_{A-L}(15,180,20)$ | $H_{A-R}(15,180,20)$ |
| 4 | $H_{G-L}(10,135,20)$ | $H_{G-R}(10,135,20)$ | $H_{A-L}(15,225,20)$ | $H_{A-R}(15,225,20)$ |
| 5 | $H_{G-L}(10,315,20)$ | $H_{G-R}(10,315,20)$ | $H_{A-L}(15,45,20)$ | $H_{A-R}(15,45,20)$ |

FIG. 15 transfer functions adopted according to installation positions of respective amplifiers

| table address | A | B | C | $H_C(A,B,C)$ |
|---|---|---|---|---|
| 0 | 1 | 1 | 0 | $H_C(1,1,0)$ |
| 1 | 1 | 1 | 3 | $H_C(1,1,3)$ |
| 2 | 1 | 1 | 6 | $H_C(1,1,6)$ |
| : | | : | : | |
| 119 | 1 | 1 | 357 | $H_C(1,1,357)$ |
| 120 | 2 | 1 | 0 | $H_C(2,1,0)$ |
| 121 | 2 | 1 | 3 | $H_C(2,1,3)$ |
| 122 | 2 | 1 | 6 | $H_C(2,1,6)$ |
| : | | : | : | |
| 239 | 2 | 1 | 357 | $H_C(2,1,357)$ |
| 240 | 1 | 2 | 0 | $H_C(1,2,0)$ |
| 241 | 1 | 2 | 3 | $H_C(1,2,3)$ |
| 242 | 1 | 2 | 6 | $H_C(1,2,6)$ |
| : | | : | : | |
| | | | | |
| : | | : | : | |
| 479 | 2 | 2 | 357 | $H_C(2,2,357)$ |

FIG. 16 setting instructions through application and values transmitted to headphone

| initial value | A | B | C |
|---|---|---|---|
| T1 | 2 | 1 | 0,3,6,···,357(initial value:0) |
| T2 | 2 | 1 | 0,3,6,···,357(initial value:0) |
| T3 | 2 | 1 | 0,3,6,···,357(initial value:0) |
| T4 | 2 | 2 | 0,3,6,···,357(initial value:0) |
| T5 | 1 | 2 | 0,3,6,···,357(initial value:0) |

FIG. 17

| $Y_G$ | C |
|---|---|
| 0 | 0 |
| 45 | 0 |
| 90 | 0 |
| 135 | 0 |
| 180 | 0 |
| 225 | 0 |
| 270 | 0 |
| 315 | 0 |

FIG. 22A

| $Y_G$ | C |
|---|---|
| 0 | 0 |
| 45 | 45 |
| 90 | 90 |
| 135 | 135 |
| 180 | 180 |
| 225 | 225 |
| 270 | 270 |
| 315 | 315 |

FIG. 22B stage mode

NON-TRANSITORY COMPUTER-READABLE MEDIUM HAVING COMPUTER-READABLE INSTRUCTIONS AND SYSTEM

CROSS-REFERENCE TO RELATED APPLICATION

This application is a continuation application of and claims priority benefit of a U.S. application Ser. No. 18/191,878, filed on Mar. 29, 2023, which is a continuation application of and claims priority benefit of a U.S. application Ser. No. 17/585,575, filed on Jan. 27, 2022, which is a continuation application of and claims priority benefit of a U.S. application Ser. No. 17/136,002, filed on Dec. 29, 2020, which is a continuation application of and claims priority benefit of a U.S. application Ser. No. 17/109,156, filed on Dec. 2, 2020, which claims the priority of Japan patent application serial no. 2019-219985, filed on Dec. 4, 2019. The entirety of each of the above-mentioned patent applications is hereby incorporated by reference herein and made a part of this specification.

BACKGROUND

Technical Field

The present disclosure relates to a headphone.

Description of Related Art

In recent years, there have been headphones that receive a signal for reproduced sound from a smartphone and a signal for the performance sound of a guitar through wireless communication and makes it possible to listen to mixed sounds (for example, Patent Document 1). In addition, it is known that a head transfer function of a path based on a user's posture may be determined from a sound producing position of a musical instrument, and musical sound output from headphones may be localized using the head transfer function (for example, Patent Document 2). In addition, there are headphones that update signal processing details in a signal processing device in accordance with a rotation angle of a listener's head to localize a sound image outside the head (for example, Patent Document 2). In addition, there is Patent Document 4 as related art pertaining to the invention of the present application.

PATENT DOCUMENTS

[Patent Document 1] Japanese Patent Laid-Open No. 2017-175256

[Patent Document 2] Japanese Patent Laid-Open No. 2018-160714

[Patent Document 3] Japanese Patent Laid-Open No. H8-009489

[Patent Document 4] Japanese Patent Laid-Open No. H1-121000

SUMMARY

According to an embodiment, there is provided a headphone including right and left ear pieces and a connecting portion which connects the right and left earpieces to each other, the headphone including a control part which changes a position at which a sound image is localized in accordance with an orientation of a user's head, with respect to at least one of a first musical sound and a second musical sound different from the first musical sound, the first musical sound and the second musical sound being input to the headphone, and a speaker which is included in each of the right and left earpieces and to which a signal of a mixed sound of the first musical sound and the second musical sound is connected in a case where the position at which at least one sound image is localized is changed by the control part.

BRIEF DESCRIPTION OF THE DRAWINGS

FIG. 13A is a table showing initial values of X and Y in respective modes, and FIG. 13B is a table showing initial values of Z.

FIG. 14 is a table showing transfer functions to be adopted in accordance with respective positions.

FIG. 15 shows a specific example of transfer functions to be adopted.

FIG. 16 is a table showing transfer functions to be adopted in accordance with installation positions of respective amplifiers.

FIG. 17 is a table showing a setting instruction given through a terminal (application) and values transmitted to a headphone.

FIGS. 22A and 22B are tables showing states shown in FIGS. 21A and 21B.

DESCRIPTION OF THE EMBODIMENTS

Figure 1:
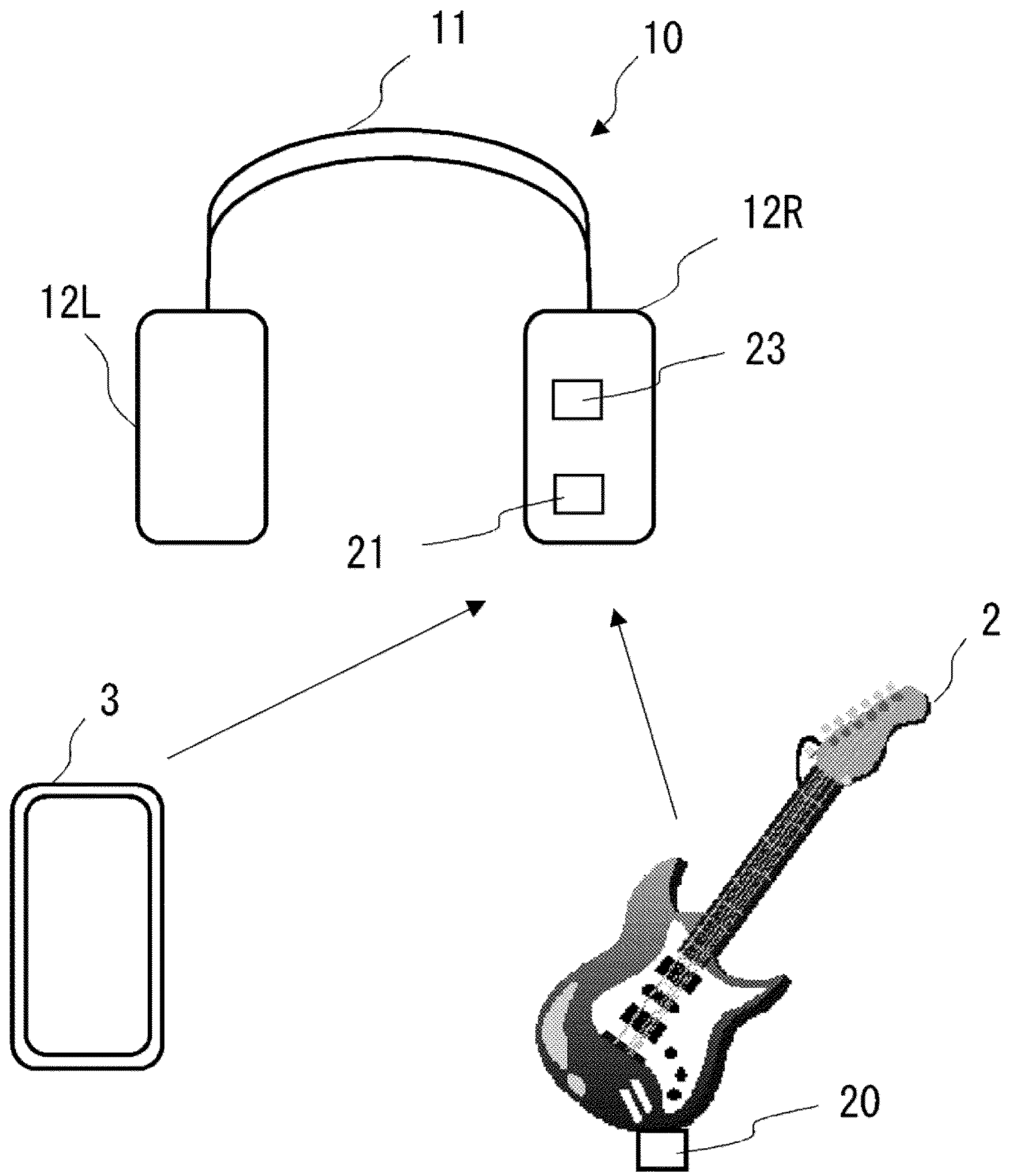
FIG. 1 is a diagram showing an appearance configuration of a headphone according to an embodiment.

The disclosure provides a headphone capable of controlling a position at which a sound image of each of musical sounds to be mixed is localized.

A headphone according to an embodiment is a headphone including right and left ear pieces and a connecting portion connecting the right and left ear pieces to each other, and include the following components.

(1) A control part that changes a position at which a sound image is localized in accordance with the orientation of a user's head, with respect to at least one of a first musical sound and a second musical sound different from the first musical sound, which are input to the headphone.

(2) A speaker which is included in each of right and left ear pieces and to which a signal of a mixed sound is connected, the mixed sound being a mixed sound of the first musical sound and the second musical sound in a case where the control part changes a position at which at least one sound image is localized.

According to the headphone, a user can change a localization position of at least one of the first and second musical sounds in accordance with the displacement of the head and can listen to a mixed sound of the first and second musical sounds respectively localized at desired positions. The control part is, for example, a processor, and the processor may be constituted by an integrated circuit such as a CPU, a DSP, an ASIC, or an FPGA, or a combination thereof. The orientation of the head can be detected using, for example, a gyro sensor.

In the headphone, the control part may be configured to apply an effect of simulating a case where the first musical sound is output from a cabinet speaker with the front facing the user to the first musical sound, independently of a position at which a sound image of the first musical sound is localized. In this manner, with respect to the first musical sound, it is possible to listen to a simulation sound in a case where the first musical sound is output from the cabinet speaker with the front facing the user, independently of localization. That is, it is possible to listen to the high-quality first musical sound independently of the displacement of the head. In this case, the orientation of the user may not face the cabinet speaker.

In the headphone, the orientation of the head includes a rotation angle of the head in a horizontal direction, and the headphone may be configured such that the position of a sound source outside the head is changed using a head transfer function from the sound source to the user's right and left ears in accordance with the rotation angle. In this manner, localization can be changed in accordance with the orientation of the user's head. *The displacement of the head may include not only a rotation angle in the horizontal direction but also a height and an inclination in a vertical direction (elevation: tilt angle).

In the headphone, a configuration in which the first musical sound is a musical sound generated in real time by the user may be adopted. Sound generated in real time may be a performance sound of an electronic musical instrument or a smartphone application or may be sound from a user (singing voice) collected by a microphone or an analog musical instrument sound. The second musical sound may be sound reproduced from a smartphone or a smartphone application performance sound.

In the headphone, a configuration may be adopted in which the first musical sound is input to the headphone through first wireless communication, and the second musical sound is input to the headphone through second wireless communication. As the first and second musical sounds are inputted in a wireless manner, there is no complexity in handling physical signal lines. Further, in a case where the first and second musical sounds are generated in real time through a performance or the like, it is possible to avoid the physical signal lines inhibiting smooth generation of the musical sounds. Wireless communication standards to be applied to the first wireless communication and the second wireless communication may be the same as or different from each other. Crosstalk, interference, erroneous recognition, or the like can be avoided due to a difference.

In the headphone, a configuration may be adopted in which sound when sound is generated from a position of predetermined reference localization is used to generate mixed sound with respect to the first musical sound and second musical sound for which the change of a position at which a sound image is localized, being performed by the control part, is set to be in an off state. The turn-on and turn-off of a reference localization position, a guitar effect, and sound field processing can be set using an application of a terminal, and setting information can be stored in a storage device (flash memory or the like).

Hereinafter, a musical sound generation method and a musical sound generation device according to the embodiment will be described with reference to the drawings. A configuration according to the embodiment is an example, and the disclosure is not limited to the configuration.

Appearance Configuration of Headphone

FIG. 1 is a diagram showing an appearance configuration of a headphone according to the embodiment. In FIG. 1, a headphone 10 has a configuration in which a right ear piece 12R and a left ear piece 12L are connected to each other through a U-shaped connecting portion 11. Each of the ear pieces 12R and 12L is also referred to as an ear pad, and the connecting portion 11 is referred to as a headband or a headrest.

The headphone 10 is worn on a user's head by covering the user's right ear with the ear piece 12R, covering the left ear with the ear piece 12L, and supporting the connecting portion 11 with the vertex of the head. A speaker is provided in each of the ear pieces 12R and 12L.

Wireless communication equipment, called a transmitter 20, which performs wireless communication with the headphone 10 is connected to a guitar 2. The ear piece 12R of the headphone 10 includes a receiver 23, and wireless communication is performed between the transmitter 20 and the receiver 23. The guitar 2 is an example of an electronic musical instrument, and may be an electronic musical instrument other than an electronic guitar. The electronic musical instrument also includes an electric guitar. In addition, musical sound is not limited to musical instrument sound, and also includes sound such as a person's singing sound.

The transmitter 20 includes, for example, a jack pin, and the transmitter is mounted on the guitar 2 by inserting the jack pin into a jack hole formed in the guitar 2. Signal of performance sound of the guitar 2 generated by the user himself or herself and other persons is input to the headphone 10 through wireless communication using the transmitter 20. The signals of the performance sound are connected to the right and left speakers and emitted. Thereby, the user can listen to the performance sound of the guitar 2. The performance sound of the guitar 2 is an example of a "first musical sound".

The ear piece 12R of the headphone 10 further include a Bluetooth (BT, registered trademark)) communication device 21. The BT communication device 21 performs BT communication with a terminal 3 and can receive a signal of musical sound reproduced by the terminal 3 (for example, one or two or more musical instrument sounds such as a drum sound, a bass guitar sound, and a backing band sound). Thereby, the user can listen to a musical sound from the terminal 3. The reproduced sound of the terminal 3 is an example of a “second musical sound”. However, the second musical sound includes not only a reproduced sound but also a sound based on musical sound data in a data stream relayed by the terminal 3, a musical sound collected by the terminal 3 using a microphone, and a musical sound generated by operating a performance application executed by the terminal 3.

In this manner, the headphone 10 is provided with a plurality of input systems (two systems in the present embodiment) supplying a signal of a musical sound through wireless communication. A system that inputs a performance sound of the guitar 2 is called a first system, and a system that inputs a musical sound generated by the terminal 3 is called a second system. Communication using the transmitter 20 is an independent wireless communication standard different from BT communication. Wireless communication standards to be applied to the respective systems may be the same, but different wireless communication standards are more preferable in avoiding crosstalk, interference, erroneous recognition, or the like.

Further, in a case where a performance sound and a reproduced sound are received in parallel, it is also possible to listen to a mixed sound of the performance sound and the reproduced sound by connecting the synthesized sound or the mixed sound thereof to the speakers by a circuit built into the headphone 10.

The terminal 3 may be a terminal or equipment that transmits a musical sound signal to the headphone 10 through wireless communication. For example, the terminal may be a smartphone, but may be a terminal other than a smartphone. The terminal 3 may be a portable terminal or a fixed terminal. The terminal 3 is used as an operation terminal for performing various settings on the headphone 10.

Hardware Configuration

Figure 2:
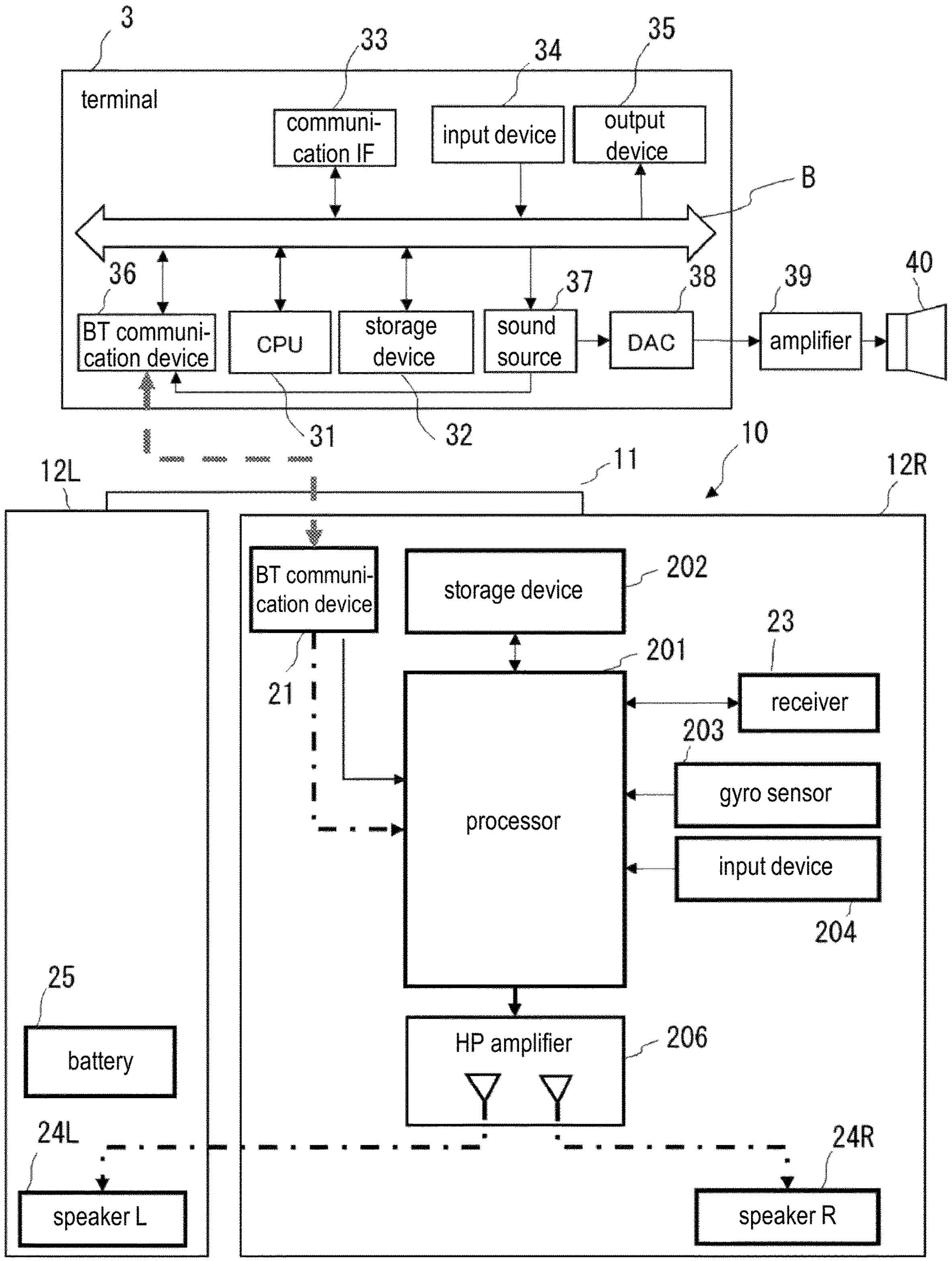
FIG. 2 shows an example of circuit configurations of a headphone and a terminal.

FIG. 2 illustrates an example of circuit configurations of the headphone 10 and the terminal 3. In FIG. 2, the terminal 3 includes a central processing unit (CPU) 31, a storage device 32, a communication interface (communication IF) 33, an input device 34, an output device 35, a BT communication device 36, and a sound source 37 which are connected to each other through a bus B. A digital analog converter (DAC) 38 is connected to the sound source 37, the DAC 38 is connected to an amplifier 39, and the amplifier 39 is connected to a speaker 40.

The storage device 32 includes a main storage device and an auxiliary storage device. The main storage device is used as a storage region for programs and data, a work area of the CPU 31, and the like. The main storage device is formed by, for example, a random access memory (RAM) or a combination of a RAM and a read only memory (ROM). The auxiliary storage device is used as a storage region for programs and data, a waveform memory that stores waveform data, or the like. The auxiliary storage device is, for example, a flash memory, a hard disk, a solid state drive (SSD), an electrically erasable programmable read-only memory (EEPROM), or the like.

The communication IF 33 is connection equipment for connection to a network such as a wired LAN or a wireless LAN, and is, for example, a LAN card. The input device 34 includes keys, buttons, a touch panel, and the like. The input device 34 is used to input various information and data to the terminal 3. The information and the data include data for performing various settings on the headphone 10.

The output device 35 is, for example, a display. The CPU 31 performs various processes by executing programs (applications) stored in the storage device 32. For example, the CPU 31 can execute an application program (application) for the headphone 10 to input the reproduction/stopping of a musical sound to be supplied to the headphone 10, the setting of an effect for a performance sound of the guitar 2, and the setting of a sound field for each input system of a musical sound and supply the sounds to the headphone 10.

When a reproduction instruction for a musical sound is input using the input device 34, the CPU 31 reads data of the musical sound based on the reproduction instruction from the storage device 32 and supplies the read data to the sound source 37, and the sound source generates a signal of a musical sound (reproduced sound) based on the data of the musical sound. The signal of the reproduced sound is transmitted to the BT communication device 36, converted into a wireless signal, and emitted. The emitted wireless signal is received by the BT communication device 21 of the headphone 10. Meanwhile, the signal of the musical sound generated by the sound source 37 may be supplied to the DAC 38 to be converted into an analog signal, amplified by the amplifier 39, and emitted from the speaker 40. However, in a case where the signal of the reproduced sound is supplied to the headphone, muting is performed on the signal of the musical sound transmitted to the DAC 38.

In the present embodiment, the ear piece 12L of the headphone 10 includes a battery 25 that supplies power to each of the parts of the headphone 10, and a left speaker 24L. Power supplied from the battery 25 is supplied to each of the parts of the ear piece 12R through wiring provided along the connecting portion 11. The battery 25 may be provided in the ear piece 12R.

The ear piece 12R includes a BT communication device 21 wirelessly communicating with the BT communication device 36, a receiver 23, and a speaker 24R. In addition, the ear piece 12R includes a processor 201, a storage device 202, a gyro sensor 203, an input device 204, and headphone (HP) amplifier 206.

The receiver 23 receives a signal (including a signal related to a performance sound of the guitar 2) transmitted from the transmitter 20 and performs wireless processing (down-conversion or the like). The receiver 23 inputs a signal having been subjected to the wireless processing to the processor 201.

The gyro sensor 203 is, for example, a 9-axis gyro sensor, and can detect movements in an up-down direction, a front-back direction, and a right-left direction, an inclination, and rotation of the user's head. An output signal of the gyro sensor 203 is input to the processor 201. Among output signals of the gyro sensor 20, at least a signal indicating a rotation angle of the head in a horizontal direction (the orientation of the head of the user wearing the headphone 10) is used for sound field processing. However, the other signals may be used for sound field processing.

The input device 204 is used to input instructions, such as the turn-on or turn-off of effect processing for a performance sound (first musical sound) of the guitar 2, the turn-on or turn-off of sound field processing related to a performance sound and a reproduced sound (first and second musical sounds) transmitted from the terminal 3, and the reset of a sound field.

The processor 201 is, for example, a system-on-a-chip (SoC), and includes a DSP that performs processing on signals of the first and second musical sounds, a CPU that performs the setting of various parameters used for signal processing and control related to management, and the like.

Programs and data used by the processor 201 are stored in the storage device 202. The processor 201 is an example of a control part.

The processor 201 performs processing on a signal of a first musical sound which is input from the receiver 23 (for example, effect processing) and processing on a signal of a second musical sound which is input from the BT communication device 21 (for example, sound field processing), and connects the processed signals (a right signal and a left signal) to the HP amplifier 206. The HP amplifier 206, which is an amplifier built into a DAC, performs DA conversion and amplification on the right signal and the left signal and connects the processed signals to the speakers 24R and 24L (examples of a speaker).

Description of Mode

In the headphone 10 of the present embodiment, in a case where a user listens to a mixed sound of first and second musical sounds, the user can listen to the mixed sound of the first and second musical sounds in a mode selected from among a "surround mode", a "static mode", and a "stage mode".

Figure 3:
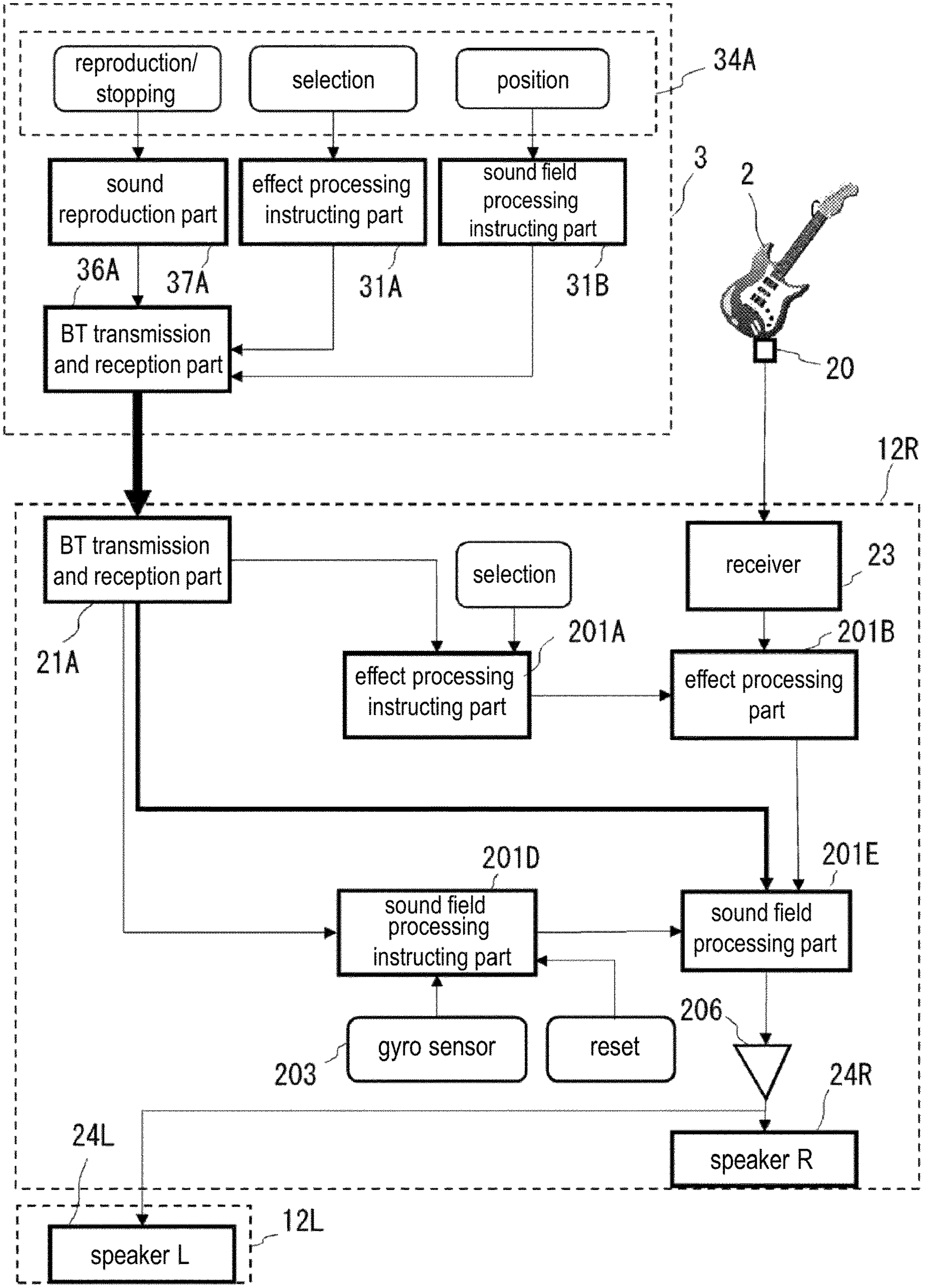
FIG. 3 is a diagram showing operations of a headphone.

The user can set an initial position at which a sound image is localized outside the user's head with respect to the first musical sound and the second musical sound by using the input device 34 and the output device 35 (touch panel 34A: FIG. 3) of the terminal 3.

When description is given using, for example, FIG. 3, the CPU 31 of the terminal 3 executes an application for the headphone 10, so that the input device 34 and the output device 35 of the terminal 3 operate as user interfaces. The CPU 31 operates as a sound reproduction part 37A, an effect processing instructing part 31A, and a sound field processing instructing part 31B. The BT communication device 36 operates as a BT transmission and reception part 36A.

As a user interface, an operator capable of setting and inputting at least an instruction for reproducing or stopping a second musical sound, an instruction regarding whether or not to apply an effect to the first musical sound, and relative positions of sound sources of the first and second musical sounds with respect to the user is provided to the user.

Figure 4A:
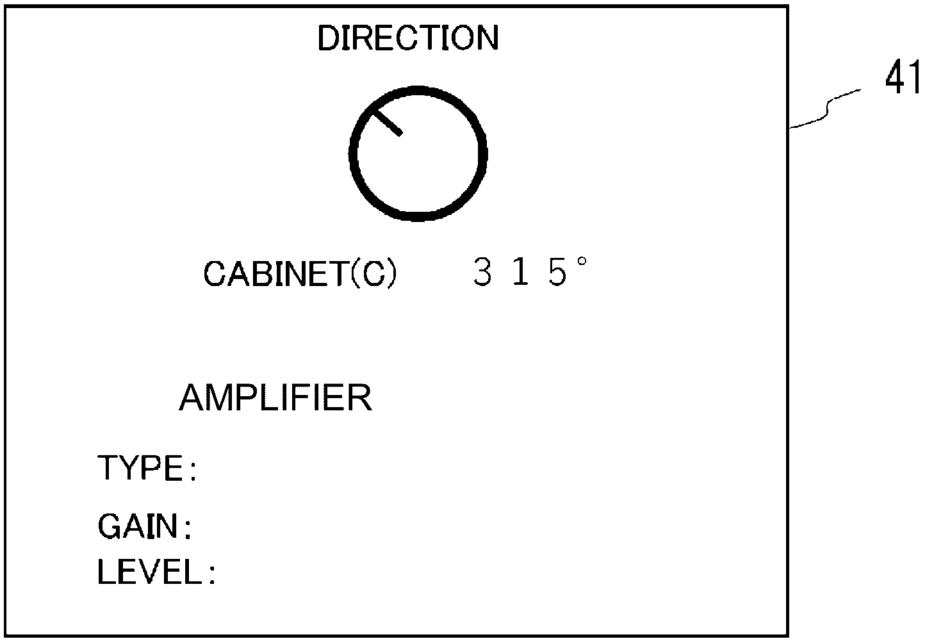
FIGS. 4A and 4B show an example of a user interface of a terminal.
Figure 4B:
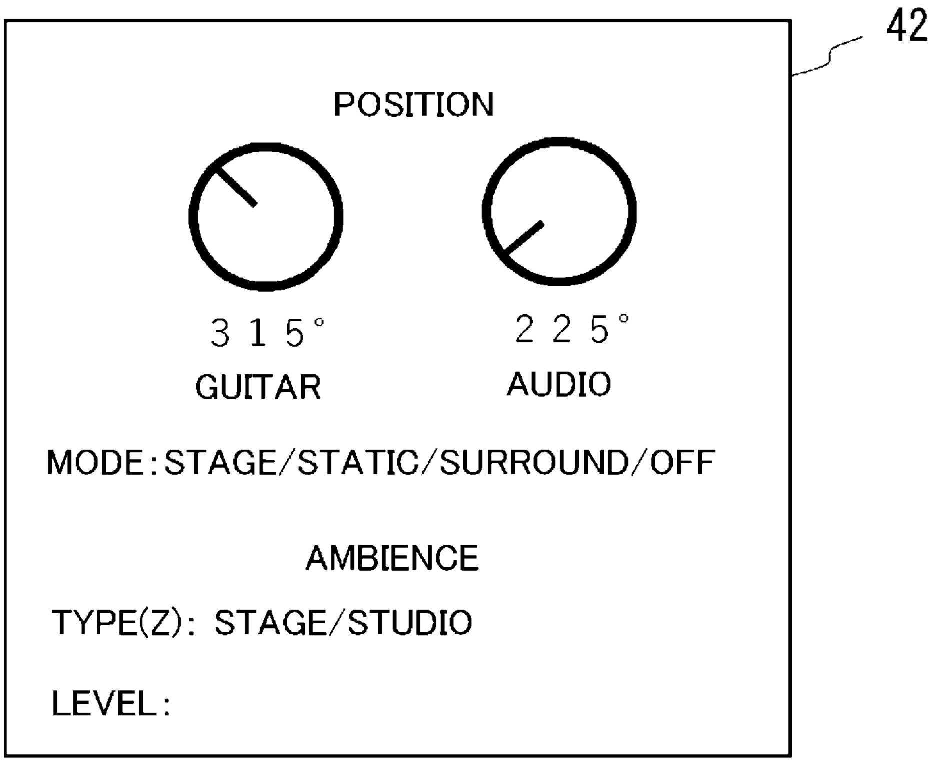

FIGS. 4A and 4B show an example of a user interface. FIG. 4A shows an operation screen 41 showing the direction of a cabinet, and the like, and FIG. 4B shows an operation screen 42 showing the positions of a performance sound (GUITAR: first musical sound) of the guitar 2 which is output from a guitar amplifier and an audio (AUDIO: a second musical sound of a backing band or the like), and the like.

The operation screen 41 is provided with a circular operator indicating the direction of the guitar amplifier with respect to a user, and the angle of the cabinet with respect to the user can be set by tracing an arc. The guitar amplifier is an example of a cabinet speaker, and the cabinet speaker will be hereinafter referred to simply as a "cabinet". A direction in which the front of the cabinet faces the user is 0 degrees. In addition, a type (TYPE), a gain, and a level of the guitar amplifier can be set using the operation screen 41.

The operation screen 42 is provided with an operator for selecting a mode (any one of a surround mode, a static mode, a stage mode, and OFF). In addition, the operation screen 42 is provided with a circular operator for setting an angle between each of the guitar amplifier (GUITAR) and the audio (AUDIO) and the user wearing the headphone 10, and an angle can be set by tracing an arc with the user's finger. In addition, the operation screen 42 includes an operator for selecting a type (stage, studio) indicating a space where the user is present, and an operator for setting a level.

The CPU 31 operating as the sound reproduction part 37A turns on or turns off a reproduction operation of a second musical sound in response to an instruction for reproduction or stopping. The CPU 31 operating as the effect processing instructing part 31A generates the necessity of applying an effect and parameters (parameters indicating amplifier frequency characteristics, speaker frequency characteristics, cabinet resonance characteristics, and the like) in a case where an effect is applied, and includes the necessity and the parameters in targets to be transmitted by the BT transmission and reception part 36A.

The CPU 31 operating as the sound field processing instructing part 31B receives information indicating positions (initial positions) at which sound fields of the first and second musical sounds are localized centering on the position of the user, as relative positions of the sound sources of the first and second musical sounds with respect to the user. For example, it is assumed that the first musical sound (the performance sound of the guitar 2) is output (emitted) from the guitar amplifier disposed in front of the user. Then, a position at which the guitar amplifier (sound source) is present centering on the user (a relative angle with respect to the user) in a horizontal direction is set.

For example, an angle at which the sound source (guitar amplifier) is located is set by setting 0 degrees in a case where the user is facing in a certain direction. This is the same as for audio of which the sound source is the second musical sound. The position of the sound source of the first musical sound and the position of the sound source of the second musical sound may be different from or the same as each other.

In the surround mode, even when the user wearing the headphone 10 changes the orientation (rotation angle) of the head in the horizontal direction, the sound fields of the first and second musical sounds are kept fixed at the initial positions. In the static mode, a position at which a sound image of the first musical sound (guitar amplifier) is localized is changed in association with the change in the orientation of the user's head, while the sound field of the second musical sound (audio) is kept fixed at the initial position. In other words, in the static mode, when the user with a guitar changes the orientation of the head, the position of the sound source (guitar amplifier) of the first musical sound is changed, but the sound field of the second musical sound (audio) is not changed. In the stage mode, the positions of the sound sources of both the first and second musical sounds (the guitar amplifier and the audio) are changed in association with the change in the orientation of the head.

The sound field processing instructing part 31B includes information for specifying the current mode, information indicating the initial positions of the sound sources of the first and second musical sounds, and the like in targets to be transmitted by the BT transmission and reception part 36A. The BT transmission and reception part 36A transmits data of a second musical sound in a case where an instruction to perform reproduction is given, information supplied from the effect processing instructing part 31A, and information supplied from the sound field processing instructing part 31B through wireless communication using BT. The BT communication device 21 of the ear piece 12R receives the data and the information transmitted from the BT transmission and reception part 36A.

Effect Processing

The receiver 23 receives a signal of a first musical sound, which is a performance sound of the guitar 2, received through the transmitter 20. With respect to the first musical sound received by the receiver 23, the processor 201 operates as an effect processing instructing part 201A and an effect processing part 201B.

The effect processing instructing part 201A gives an instruction based on the necessity of applying an effect (effect processing) and parameters in a case where an effect is applied to the effect processing part 201B, the instruction being acquired by being received from the BT transmission and reception part 21A, input from the input device 204, or read from the storage device 202.

In a case where effect processing is not necessary, the effect processing part 201B does not perform (passes) effect application on the signal of the first musical sound. On the other hand, in a case where effect processing is necessary, the effect processing part 201B performs a process of applying an effect based on parameters received from the effect processing instructing part 201A to the first musical sound.

Figure 5:
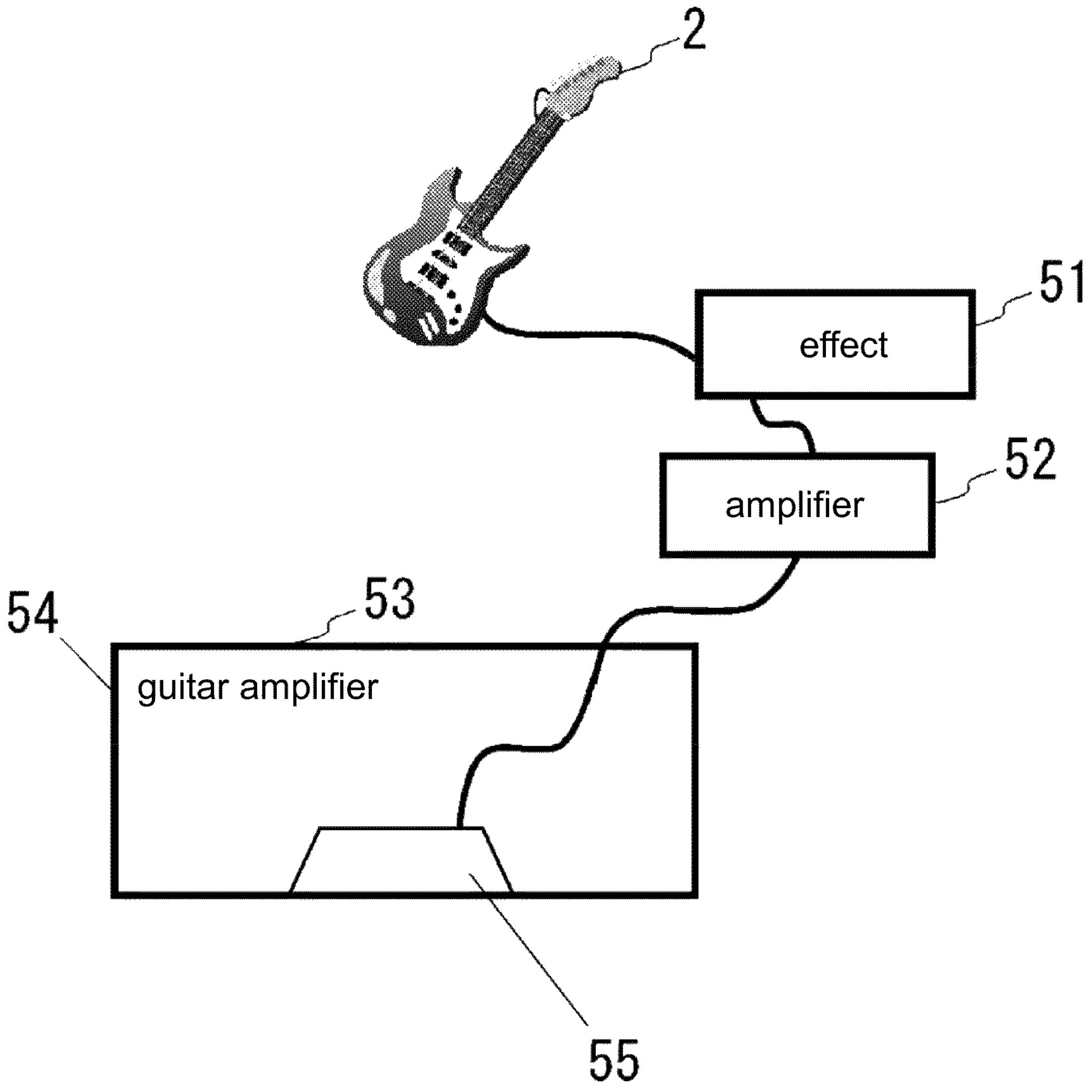
FIG. 5 shows a configuration example in a case where an effect is applied to a performance sound of a guitar, and this processed performance sound is output from a guitar amplifier.

Here, effect processing performed on a first musical sound which is executed in the headphone 10 will be described. FIG. 5 shows a configuration example in a case where an effect is applied to a performance sound of the guitar 2, and this processed performance sound is output from the guitar amplifier 53. An effect 51 and an amplifier 52 are inserted into a signal line connecting the guitar 2 and the guitar amplifier 53 to each other. The guitar amplifier 53 includes a cabinet 54 and a speaker 55 accommodated in the cabinet 54.

Regarding characteristics of the effect 51, various characteristics based on the type of effect selected by a user are applied. For example, in a case where an equalizer is selected for the effect 51, frequency characteristics in which an amplification level is different for each bandwidth are obtained. The type of effect may be anything other than an equalizer. Frequency characteristics of the amplifier 52 and frequency characteristics of the speaker 55 are frequency characteristics obtained by measuring an output waveform in a case where a sweeping sound is input to the guitar amplifier 53 to be modeled. Meanwhile, a method of obtaining the above-described frequency characteristics may be applied to a guitar amplifier of a type in which the amplifier 52 is built into a cabinet.

Figure 6:
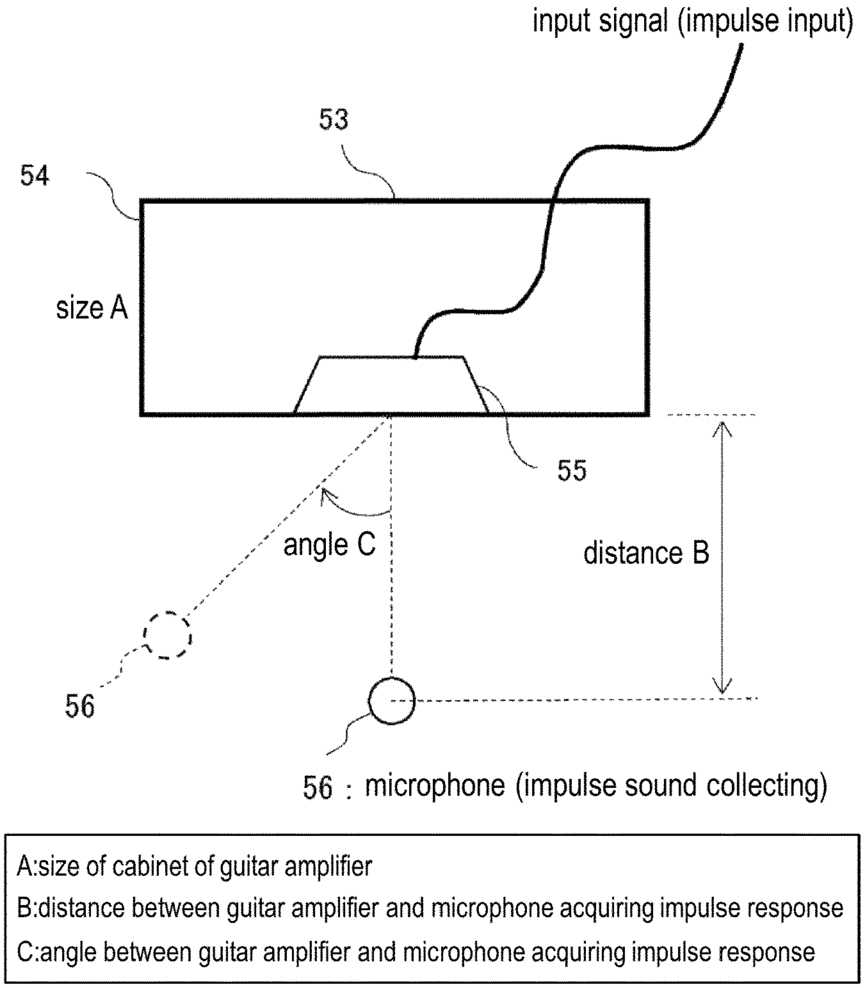
FIG. 6 is a diagram showing features of resonance of a guitar amplifier.

It is known that the cabinet resonance characteristics are reverberation characteristics of a space in the cabinet 54 and obtained by measuring an impulse response, or the like. As shown in FIG. 6, a resonance feature of the guitar amplifier 53 is mainly determined by the speaker 55 and the cabinet 54. An output sound of the guitar amplifier 53 is characterized not only by a direct sound heard from the speaker 55 but also by a reverberant sound in the cabinet 54. The reverberant sound reaches the user's ears as a sound emitted from a bass reflex port provided on the front surface of the guitar amplifier 53 or as a vibration sound of the speaker 55 and the entire cabinet 54.

A signal processing technique for simulating resonance in a space in the cabinet 54 on the basis of an impulse response is known. In the present embodiment, an FIR filter with reduced order in a state where reverberation characteristics of a space obtained on the basis of a measured impulse response are approximated is adopted.

The following procedure can be adopted as a method of measuring an impulse response.

(1) The guitar amplifier 53 and the microphone 56 are installed in an anechoic room with a distance B therebetween. In this case, the guitar amplifier 53 and the microphone 56 are installed such that their front surfaces face each other at an angle of 0 degrees.

(2) An impulse waveform is input to the guitar amplifier 53, and the guitar amplifier 53 generates a sound.

(3) Filter characteristics of an FIR filter are determined on the basis of an impulse response waveform recorded by collecting the generated sound by the microphone 56.

A size A shown in FIG. 6 indicates the size of the cabinet of the guitar amplifier 53, and an angle C indicates an angle between the cabinet 54 and the microphone 56 (0 degrees in a case where the front surface of the cabinet 54 faces the microphone 56). Meanwhile, the distance B may be set according to preferences depending on hearing conditions of resonance of the cabinet 54. In general, a case where the distance B is set to be short is called on microphone setting, and a case where the distance is set to long is called off microphone setting. That is, the distance B is not related to sound field processing to be described later. A sound collected by the microphone 56 is a monaural sound collected by one microphone 56, but resonance elements of the cabinet 54 are included in the monaural sound.

Figure 7:
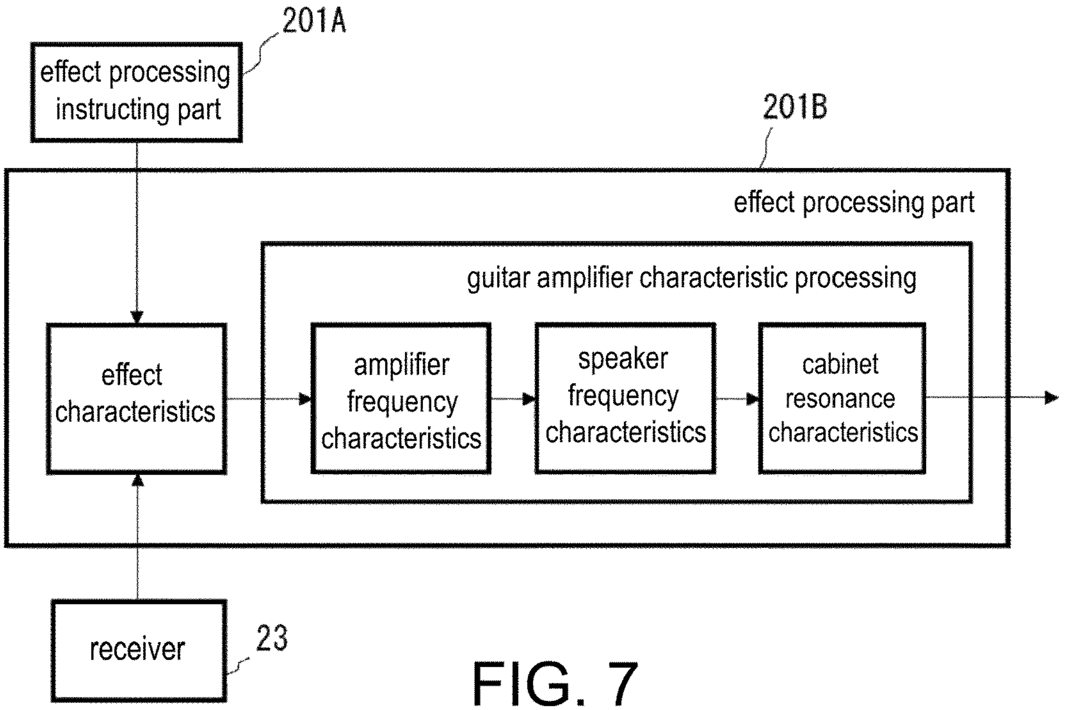
FIG. 7 shows processing performed by an effect processing part shown in FIG. 3.

FIG. 7 shows processing performed by the effect processing part 201B shown in FIG. 3 and the like. Effects of a type and characteristics instructed by the effect processing instructing part 201A are applied to a performance sound of the guitar 2 which is input from the receiver 23. In addition, as guitar amplifier characteristics processing, modification corresponding to amplifier frequency characteristics, speaker frequency characteristics, and cabinet resonance characteristics obtained by measurement is performed on an input signal, so that a predetermined effect (for example, sound volume adjustment using an equalizer) is applied, and a performance sound of the guitar 2 obtained by simulating a case where a sound is emitted from the guitar amplifier 53 (an example of a cabinet speaker) to be simulated is output.

Sound Field Processing

The processor 201 operates as a sound field processing instructing part 201D and a sound field processing part 201E by executing a program. A first musical sound transmitted from the effect processing part 201B and a second musical sound transmitted from the BT transmission and reception part 21A are input to the sound field processing part 201E.

The sound field processing instructing part 201D outputs an instruction to the sound field processing part 201E on the basis of information regarding sound field processing (the type of mode, a setting value of the orientation of the cabinet, initial positions (setting values) of the guitar amplifier and the audio, and the like) transmitted from the BT transmission and reception part 21A, the orientation of the head (a rotation angle of the head) in the horizontal direction which is detected by the gyro sensor 203, and information which is input by an input device of the headphone 10.

Figure 8A:
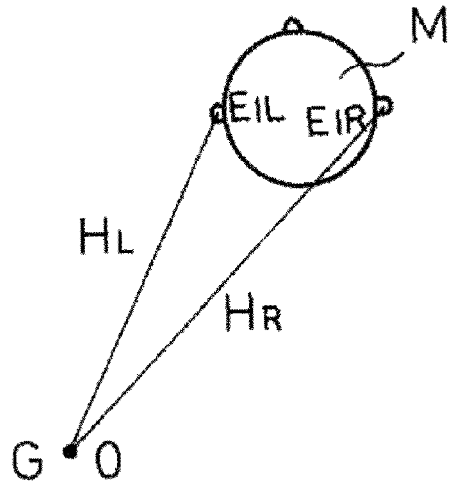
FIGS. 8A to 8C are diagrams showing sound field processing.

Regarding the sound field processing, as shown in FIG. 8A, when a sound pressure O is generated from a sound source G, a transfer function to the left ear of a listener M is set to be $H_L$, and a transfer function from the sound source G to the right ear of the listener M is set to be $H_R$, an input sound pressure $E_{1L}$ for the left ear and an input sound pressure $E_{1R}$ for the right ear are shown as the following expressions.

$$E_{1L}=O\cdot H_L$$

$$E_{1R}=O\cdot H_R$$

Regarding a positional relationship between the listener M and the sound source G, the following state is considered that: a sound image is localized based on a positional relationship between the listener M and the sound source G in a space covered with a reflecting wall W as shown in FIG.

9 instead of FIG. 8A is simulated. As sound field processing, the following method can be used focusing on a head transfer function.

That is, the following transfer function transfer functions are defined with respect to a case where a sound pressure O is generated from the sound source G in the space.

Figure 8B:
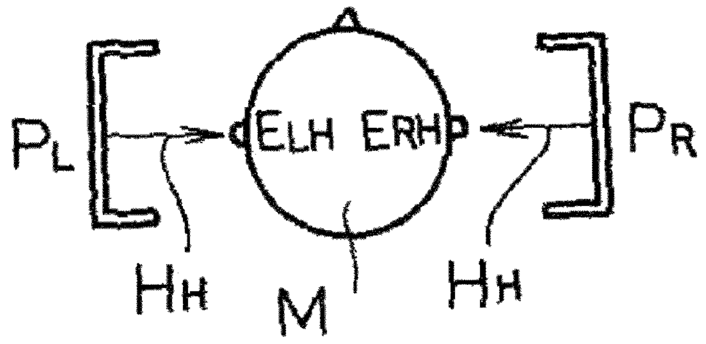

- A transfer function $H_{F\text{-}L(1)}$ until a sound pressure O of a point sound source signal is directly input to the left ear of the listener M
- A transfer function $H_{F\text{-}L(2)}$ until a sound pressure O of a point sound source signal is reflected from a left wall and then input to the left ear of the listener M
- A transfer function $H_{R\text{-}L}$ until a sound pressure O of a point sound source signal is reflected from a right wall and then input to the left ear of the listener M through the head
- A transfer function $H_{F\text{-}R(1)}$ until a sound pressure O of a point sound source signal is transmitted to the head and input to the right ear of the listener M
- A transfer function $H_{F\text{-}R(2)}$ until a sound pressure O of a point sound source signal is reflected from the left wall and then input to the right ear of the listener M through the head
- A transfer function $H_{R\text{-}R}$ until a sound pressure O of a point sound source signal is reflected from the right wall and then input to the right ear of the listener M As shown in FIG. 8B, in headphone, when a transfer function until sound pressures of a left sound signal $P_L$ and a right sound signal $P_R$ are input to right and left ears to which the sound signals are input is set to be $H_H$, an input sound pressure $E_{LH}$ for the left ear and an input sound pressure $E_{RH}$ for the right ear are represented as follows.

$$E_{LH}=P_L \cdot H_H$$

$$E_{RH}=P_R \cdot H_H$$

Figure 9:
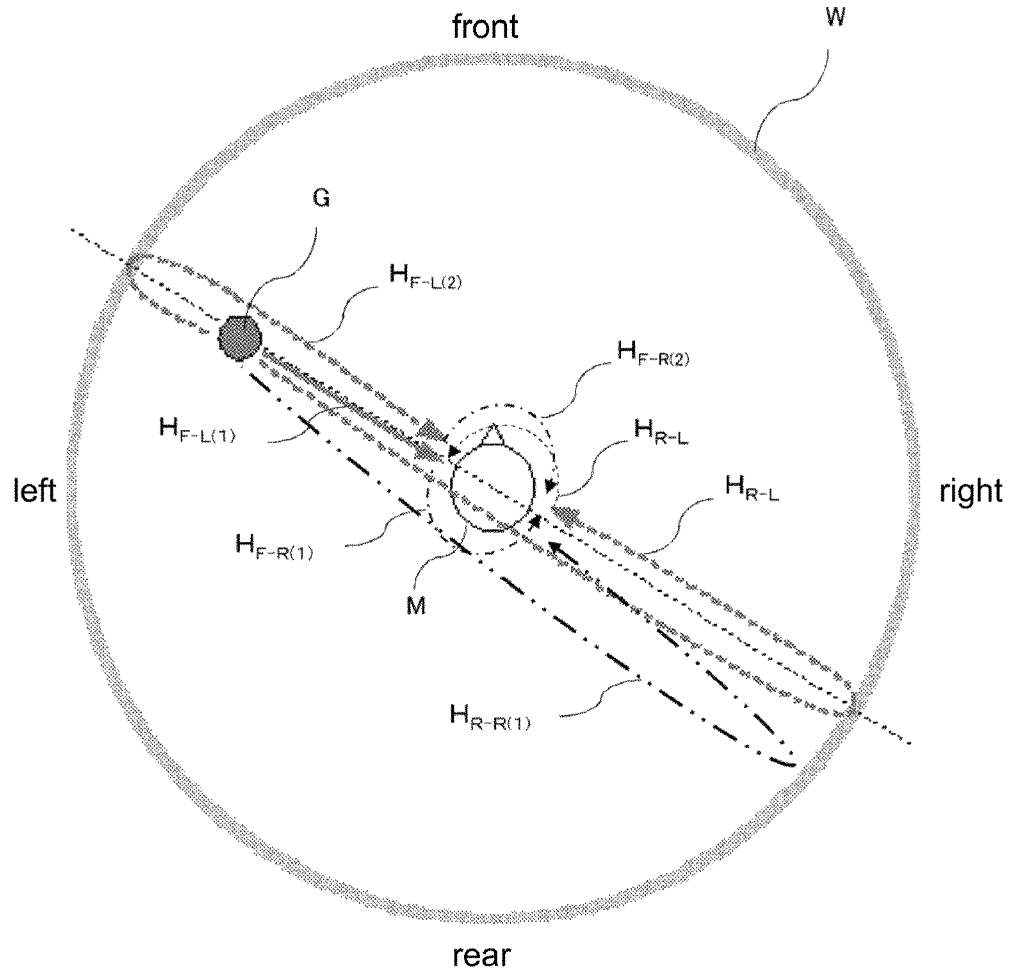
FIG. 9 is a diagram showing sound field processing.

A sound image is localized at the position of the sound source G as shown in FIG. 9 using the headphone under the following conditions.

$$E_{LH}=E_{2L}$$

$$E_{RH}=E_{2R}$$

Accordingly, modified expressions for the right and left sound signals $P_L$ and $P_R$ that are input to the headphone are as follows.

$$P_L=O \cdot H_L/H_H$$

$$P_R=O \cdot H_R/H_H$$

An input sound pressure $E_{2L}$ for the left ear and an input sound pressure $E_{2R}$ for the right ear are shown as the following expressions.

$$E_{2L}=O \cdot H_{F\text{-}L(1)}+O \cdot H_{F\text{-}L(2)}+O \cdot H_{R\text{-}L}=O \cdot (H_{F\text{-}L(1)}+H_{F\text{-}L(2)}+H_{R\text{-}L})$$

$$E_{2R}=O \cdot H_{F\text{-}R(1)}+O \cdot H_{F\text{-}R(2)}+O \cdot H_{R\text{-}R}=O \cdot (H_{F\text{-}R(1)}+H_{F\text{-}R(2)}+H_{R\text{-}R})$$

Accordingly, modified expressions for the right and left sound signals $P_L$ and $P_R$ (see FIG. 8B) that are input to the headphone are as follows.

$$P_L=O \cdot (H_{F\text{-}L(1)}+H_{F\text{-}L(2)}+H_{R\text{-}L})/H_H$$

$$P_R=O \cdot (H_{F\text{-}R(1)}+H_{F\text{-}R(2)}+H_{R\text{-}R})/H_H$$

Here, the above-described transfer functions can be set as follows using a distance X from the sound source, an angle Y with respect to the sound source, and a size Z of the space. For example, the distance X from the sound source has three stages of small, medium, and large. Setting values set by the terminal 3 are used for the distance X, the angle Y, and the size Z.

$$H_L(X,Y,Z)=H_{F\text{-}L(1)}(X,Y,Z)+H_{F\text{-}L(2)}(X,Y,Z)+H_{R\text{-}L}(X,Y,Z)$$

$$H_R(X,Y,Z)=H_{F\text{-}R(1)}(X,Y,Z)+H_{F\text{-}R(2)}(X,Y,Z)+H_{R\text{-}R}(X,Y,Z)$$

As described above, the above-described transfer functions can be obtained by an FIR filter or the like formed on the basis of an impulse response waveform obtained by observing an impulse waveform emitted from a sound source installed at an arbitrary position in the space, using a sound absorbing device such as a microphone installed at the position of the listener. As a specific example, transfer functions for respective displacements of X, Y, and Z based on resolutions required for the specifications of the device may be calculated in advance and stored, and the transfer functions may be read in accordance with a special position of a user and used for sound processing.

Figure 8C:
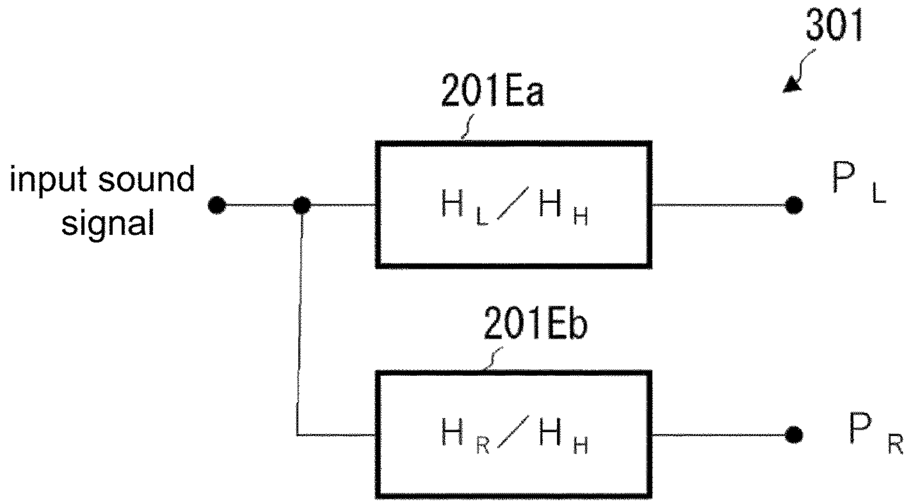

FIG. 8C shows a circuit example which is applied to the sound field processing part 201E, that is, a circuit example in which the left sound signal $P_L$ and the right sound signal $P_R$ are output from input sound signals. A circuit 301 includes a circuit 201Ea for obtaining $H_L/H_H$ and a circuit 201Eb for obtaining $H_R/H_H$, and the circuit 201Ea multiplies an input sound signal by $H_R/H_H$ and outputs a signal equivalent to the left ear signal $P_L$. The circuit 201Eb multiplies an input sound signal by $H_R/H_H$ and outputs a signal equivalent to the right ear signal $P_R$.

Figure 10:
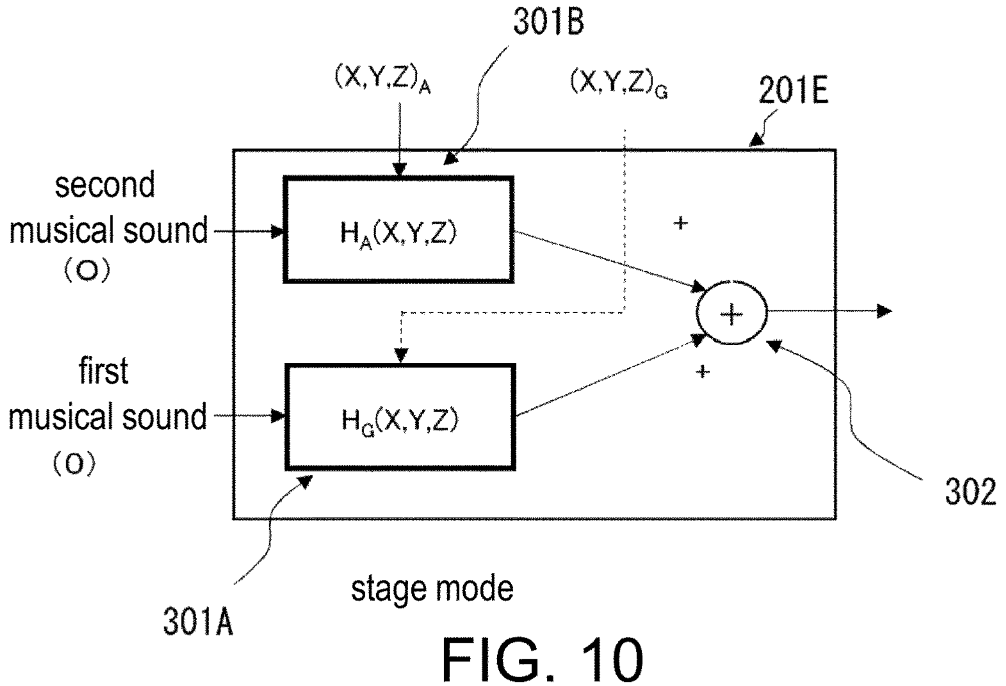
FIG. 10 is a circuit diagram showing sound field processing in a stage mode.

FIG. 10 shows a circuit configuration of the sound field processing part 201E in a stage mode. The sound field processing part 201E includes a circuit 301 (301A) using a first musical sound as an input signal (O) and a circuit 301 (301B) using a second musical sound as an input signal (O). Configurations of the circuits 301A and 301B are as shown in FIG. 8C, and a transfer function to which a value $(X,Y,Z)_G$ of X,Y,Z regarding a guitar amplifier is applied is used as the transfer functions $H_L(X,Y,Z)$ and $H_R(X,Y,Z)$ of the circuit 301A. A transfer function to which a value $(X,Y,Z)_A$ of X,Y,Z regarding an audio is applied is used as the transfer functions $H_L(X,Y,Z)$ and $H_R(X,Y,Z)$ of the circuit 301B. Signals $P_L$ and $P_R$ are output from the circuits 301A and 301B, respectively. An adder 302 performs addition of the signals $P_L$ and addition of the signals $P_R$ and outputs addition results. The outputs are connected to the amplifier 206.

Figure 11:
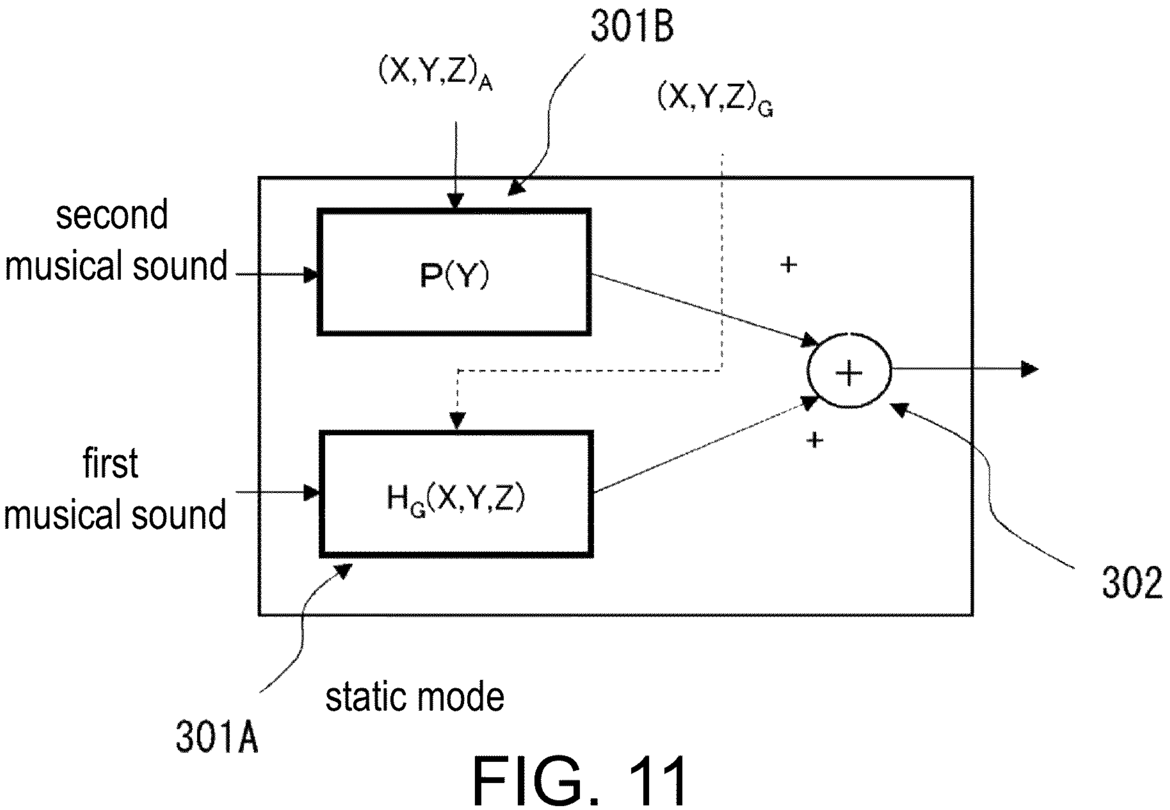
FIG. 11 is a circuit diagram showing sound field processing in a static mode.

FIG. 11 shows a circuit configuration of the sound field processing part 201E in a static mode. The sound field processing part 201E includes the circuit 301A and the circuit 301B described above. Configurations of the circuits 301A and 301B are as shown in FIG. 8C. A transfer function to which a value $(X,Y,Z)_G$ of X,Y,Z regarding the guitar amplifier is applied is used as the transfer functions $H_L(X,Y,Z)$ and $H_R(X,Y,Z)$ of the circuit 301A. A transfer function to which a setting value P(Y) of Y regarding the audio is applied is used as the transfer functions $H_L(X,Y,Z)$ and $H_R(X,Y,Z)$ of the circuit 301B. The signals $P_L$ and $P_R$ are output from the circuits 301A and 301B, respectively. The adder 302 performs addition of the signals $P_L$ and addition of the signals $P_R$ and outputs addition results. The outputs are connected to the amplifier 206.

Figure 12:
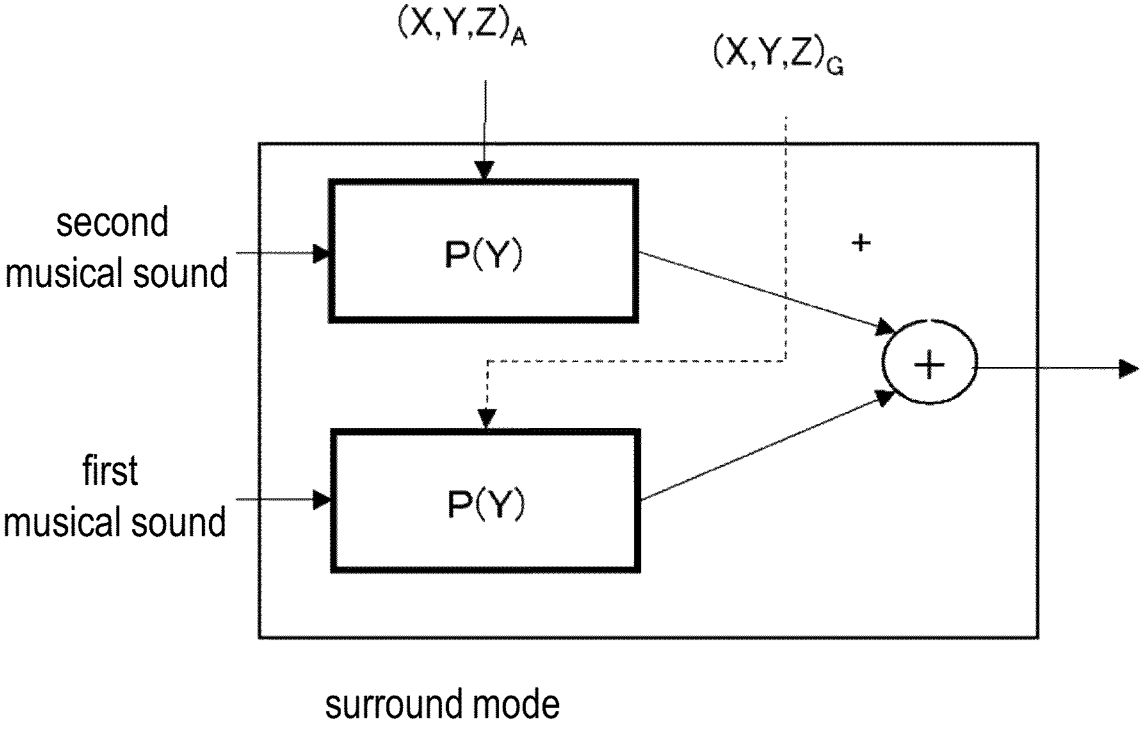
FIG. 12 is a circuit diagram showing sound field processing in a surround mode.

FIG. 12 shows a circuit configuration of the sound field processing part 201E in a surround mode. The sound field processing part 201E includes the circuit 301A and the circuit 301B described above. Configurations of the circuits 301A and 301B are as shown in FIG. 8C. A transfer function to which a setting value P(Y) of Y regarding the guitar amplifier is applied is used as the transfer functions $H_L$(X, Y,Z) and $H_R$(X,Y,Z) of the circuit 301A. In addition, a transfer function to which a setting value P(Y) of Y regarding the audio is applied is used as the transfer functions $H_L$(X,Y,Z) and $H_R$(X,Y,Z) of the circuit 301B. Signals $P_L$ and $P_R$ are output from the circuits 301A and 301B, respectively. The adder 302 performs addition of the signals $P_L$ and addition of the signals $P_R$ and outputs addition results. The outputs are connected to the amplifier 206.

SPECIFIC EXAMPLE

Hereinafter, a specific example of the headphone 10 will be described. FIG. 13A shows an example of initial values of X and Y, and FIG. 13B shows an example of a value of Z. As shown in FIG. 13A, with respect to stage, static, and surround modes, initial values of X and Y regarding the guitar amplifier and the audio are set. In a case where the stage mode is selected, the values of X and Y of the guitar amplifier and the audio can be updated using a user interface of the terminal 3 and transmitted to the headphone 10 as setting values. The value of Z indicating the size of the space is treated as a fixed value in two stages. A selected value of Z is also transmitted to the headphone 10 as a setting value.

FIG. 14 is a table showing a correspondence relationship between the values of X, Y, and Z and transfer functions $H_L$ and $H_R$. A predetermined number of records of the transfer functions $H_L$ and $H_R$ corresponding to a transfer function $H_G$(X,Y,Z) and a transfer function $H_A$(X,Y,Z) as shown in FIG. 15 can be stored in the storage device 202 in advance using such a table. In the example of FIG. 15, the predetermined number of records is five, but may be more than or less than five. Meanwhile, the transfer functions $H_L$ and $H_R$ may be able to be acquired from anything other than storage device 202.

FIG. 16 shows installation positions (A, B, and C) of the guitar amplifier (cabinet). FIG. 17 shows values of setting instructions transmitted to the headphone 10 through an application of the terminal 3. A, B, and C are as follows.

A indicates the size of the cabinet of the guitar amplifier. In a specific example, two types of sizes, that is, large (ID: 2) and small (ID: 1) are adopted.

B indicates a distance between the guitar amplifier and the microphone acquiring an impulse response. In a specific example, two types of distances of the microphone, that is, long (off microphone (ID: 2)) and short (on microphone (ID: 1)) are adopted.

C indicates an angle between the guitar amplifier and the microphone acquiring an impulse response. In a specific example, 0, 3, 6, . . . , and 357 (initial value 0) are adopted.

The table shown in FIG. 17 is stored in the storage device 32 of the terminal 3. In the terminal 3, when the type (TYPE) of AMP is selected using the operation screen 41, A and B (ID) in the table shown in FIG. 17 are transmitted to the headphone 10. For example, when a type "T1" is selected, A=2 and B=1 are transmitted to the headphone 10. In addition, the value of C which is set in the operation screen 41 is transmitted to the headphone 10. The table shown in FIG. 16 is stored in the storage device 202 of the headphone 10, and transfer functions corresponding to the values of A, B, and C are used.

Figure 18:
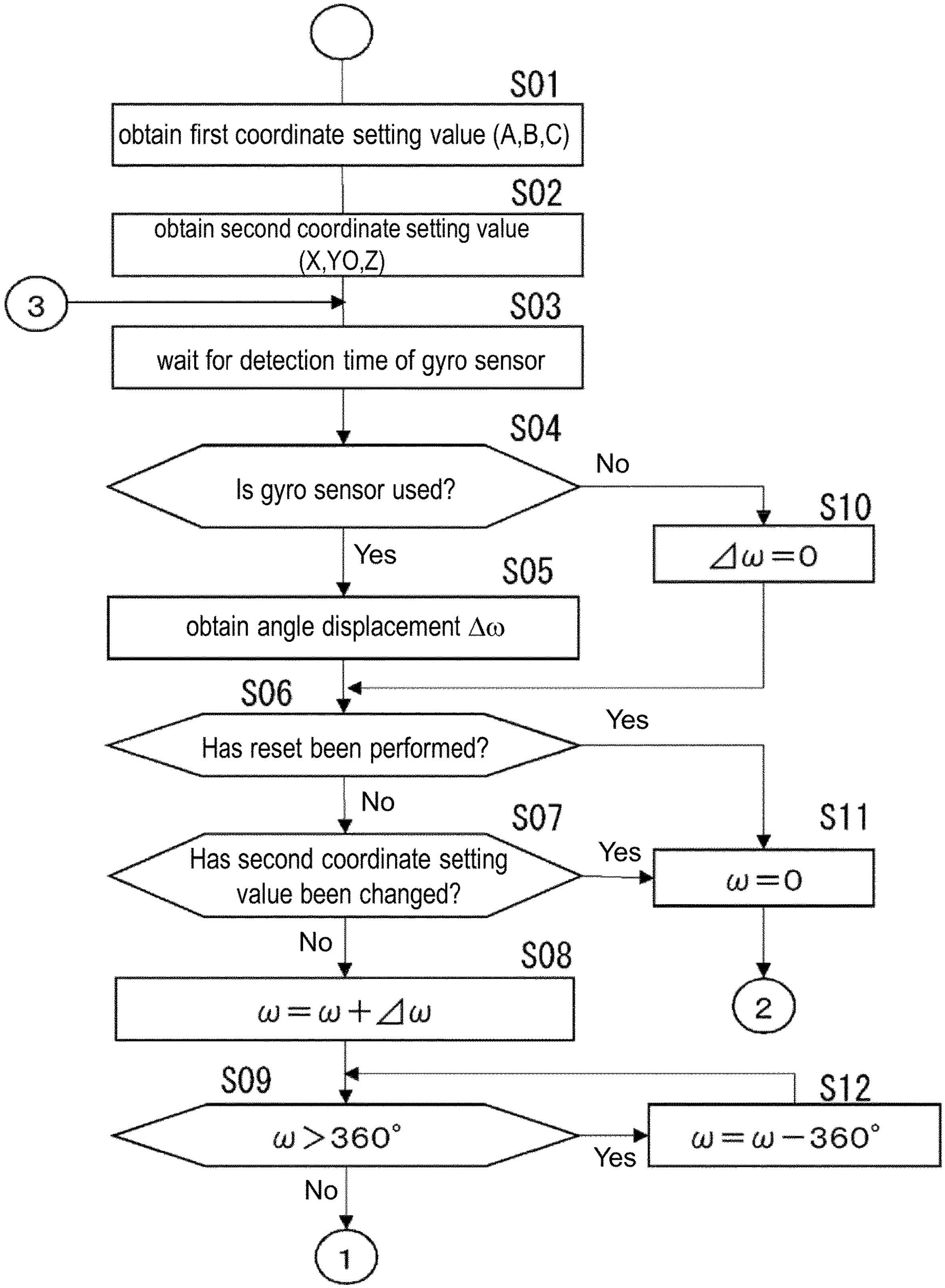
FIG. 18 is a flowchart showing an example of sound field processing.
Figure 19:
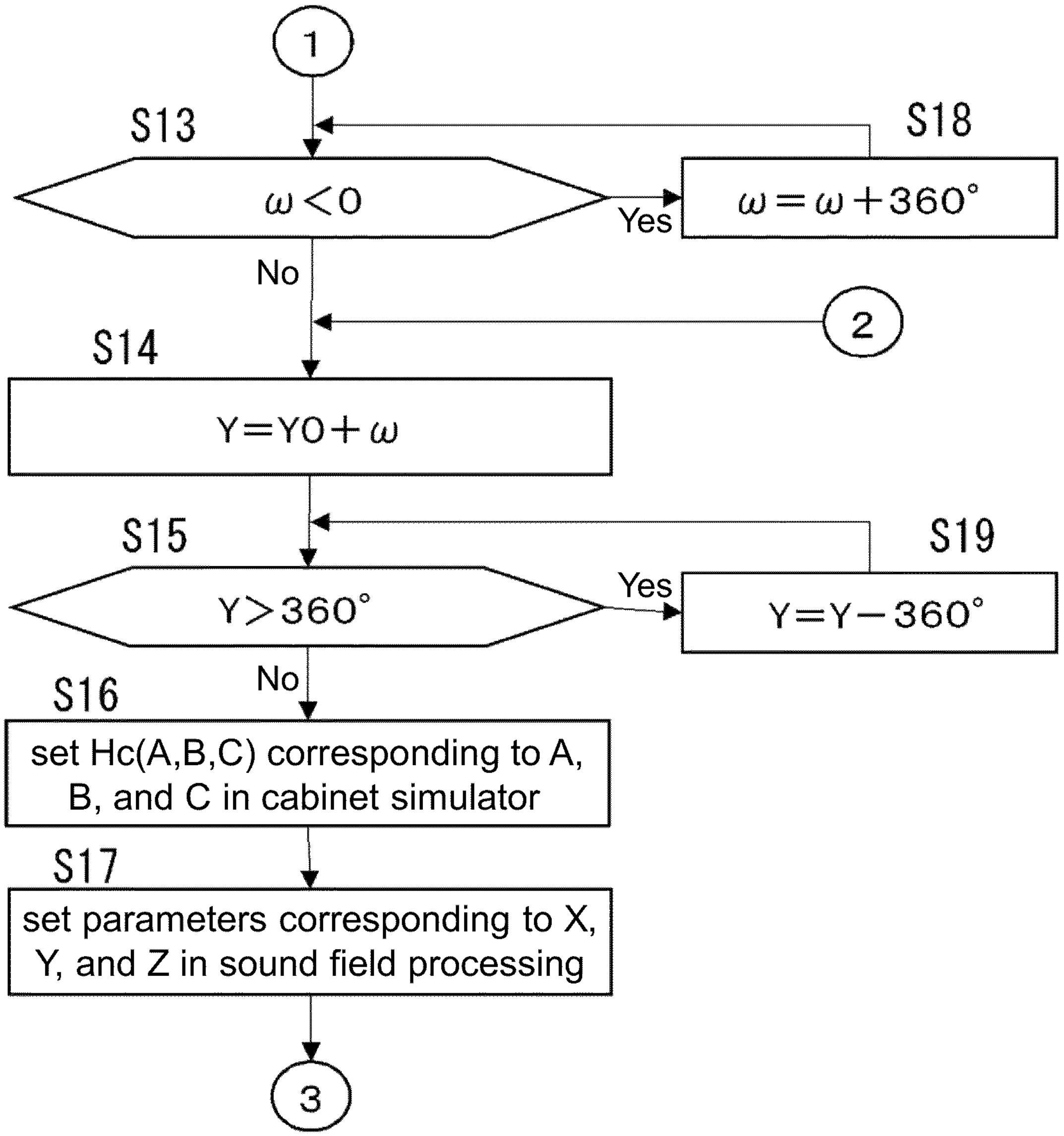
FIG. 19 is a flowchart showing an example of sound field processing.

FIGS. 18 and 19 show a processing example of the processor 201 operating as the sound field processing part 201E. In step S01, the processor 201 acquires a first coordinate setting value (A,B,C). In step S02, the processor 201 acquires a second coordinate setting value (X,Y,Z).

In step S03, the processor 201 waits for a detection time of the gyro sensor 203. In step S04, the processor 201 determines whether or not to use the gyro sensor 203. In a case where it is determined that the gyro sensor 203 is used, the processing proceeds to step 505, and otherwise, the processing proceeds to step S10.

In step S05, the processor 201 obtains an angle displacement Δω constituted by the past output of the gyro sensor 203 and an output acquired this time and causes the processing to proceed to step S06. In step S10, the processor 201 sets the value of the angle displacement Δω to 0 and causes the processing to proceed to step S06.

In step S06, it is determined whether or not a reset button has been pressed. In a case where it is determined that the reset button has been pressed, the processing proceeds to step S11, and otherwise, the processing proceeds to step S07. Here, in a case where a user desires to reset the position of a sound field, the user presses the reset button.

In step S07, the processor 201 determines whether or not the second coordinate setting value has been changed. Here, it is determined whether or not the values of X, Y, and Z have been changed in association with the reset. The determination in step S07 is performed on the basis of whether or not a flag (received from the terminal 3) indicating the change of the second coordinate setting value is in an on state. In a case where it is determined that the value has been changed (flag is in an on state), the processing proceeds to step S11, and otherwise, the processing proceeds to step S08.

In step S11, the value of ω is set to 0, and the processing proceeds to step S14. In step S08, the processor 201 sets the value of the angle co which is a cumulative value of Δω to a value obtained by adding Δω to the current value of ω, and causes the processing to proceed to step S09.

In step S09, the processor 201 determines whether or not the value of ω exceeds 360 degrees. In a case where it is determined that ω exceeds 360 degrees, the processing proceeds to step S12, and otherwise, the processing proceeds to step S13. In step S12, the value of ω is set to a value obtained by subtracting 360 degrees from ω, and the processing returns to step S09.

In step S13, the processor 201 determines whether or not the value of ω is smaller than 0. In a case where ω is smaller than 0, the value of ω is set to a value obtained by adding 360 degrees to the current value of ω (step S18), and the processor causes the processing to return to step S13. In a case where it is determined that ω is equal to or larger than 0, the processing proceeds to step S14.

In step S14, the processor 201 sets the value of Y to a value obtained by adding co to the value of a setting value Y0, and causes the processing to proceed to step S15. In step S15, it is determined whether or not the value of Y is larger than 360 degrees. In a case where it is determined that the value of Y is larger than 360 degrees, the processor sets the value of Y to a value obtained by subtracting 360 degree from the current value of Y (step S19) and causes the processing to return to step S15. In a case where it is determined that the value of Y is smaller than 360 degrees, the processing proceeds to step S16.

In step S16, the processor 201 sets a transfer function $H_C$(A,B,C) corresponding to the values of A, B, and C in a cabinet simulator that simulates a cabinet (guitar amplifier) of a type selected by the user.

In step S17, the processor 201 acquires transfer functions $H_L$ and $H_R$ corresponding to the values of X, Y, and Z to perform sound field processing. When step S17 is terminated, the processing returns to step S03.

Figure 20:
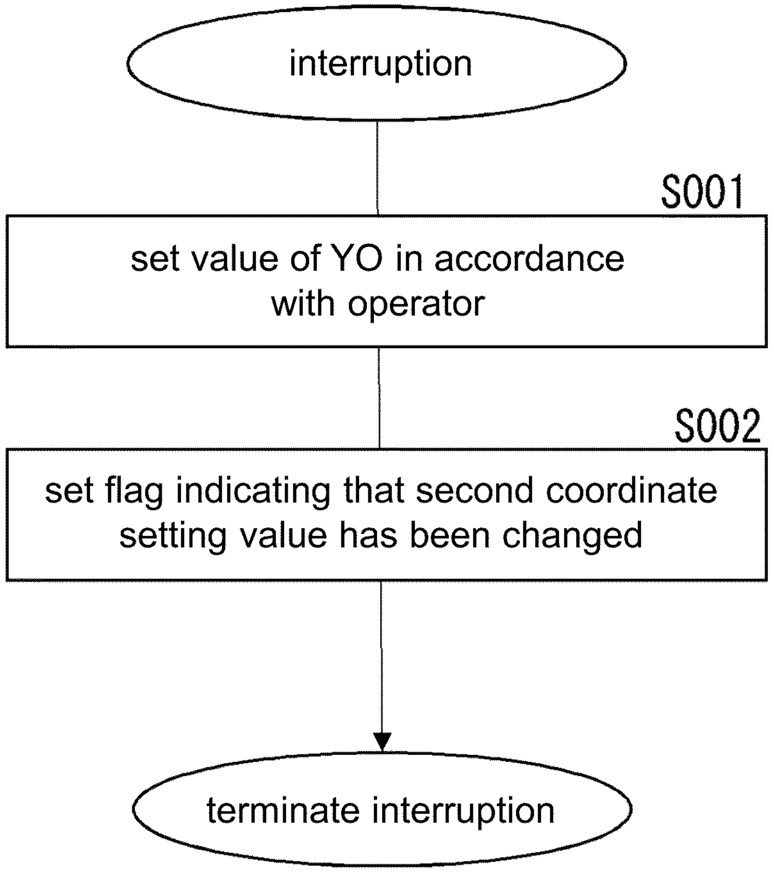
FIG. 20 is a flowchart showing an example of interruption processing.

FIG. 20 is a flowchart showing interruption processing in a case where a second coordinate setting value (an angle or the like) has been changed by the terminal 3. When a setting value of Y of at least one of a guitar amplifier and an audio is changed through an operation using the operation screen 42, the CPU 31 sets a changed value Y0 to be a setting value (step S001). In this case, the CPU 31 sets a flag indicating that the second coordinate setting value has been changed to be in an on state. The on-state flag and the updated second coordinate setting value are transmitted to the headphone 10 and used for the process of step S07, or the like.

Figure 21A:
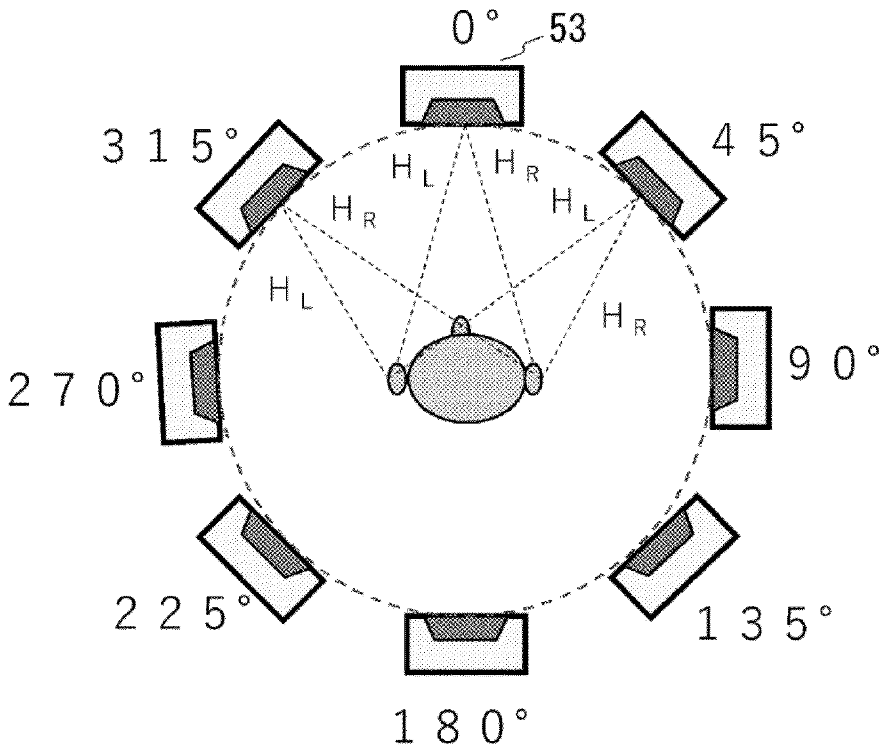
FIGS. 21A and 21B are diagrams showing a relationship between a cabinet and a listener.
Figure 21B:
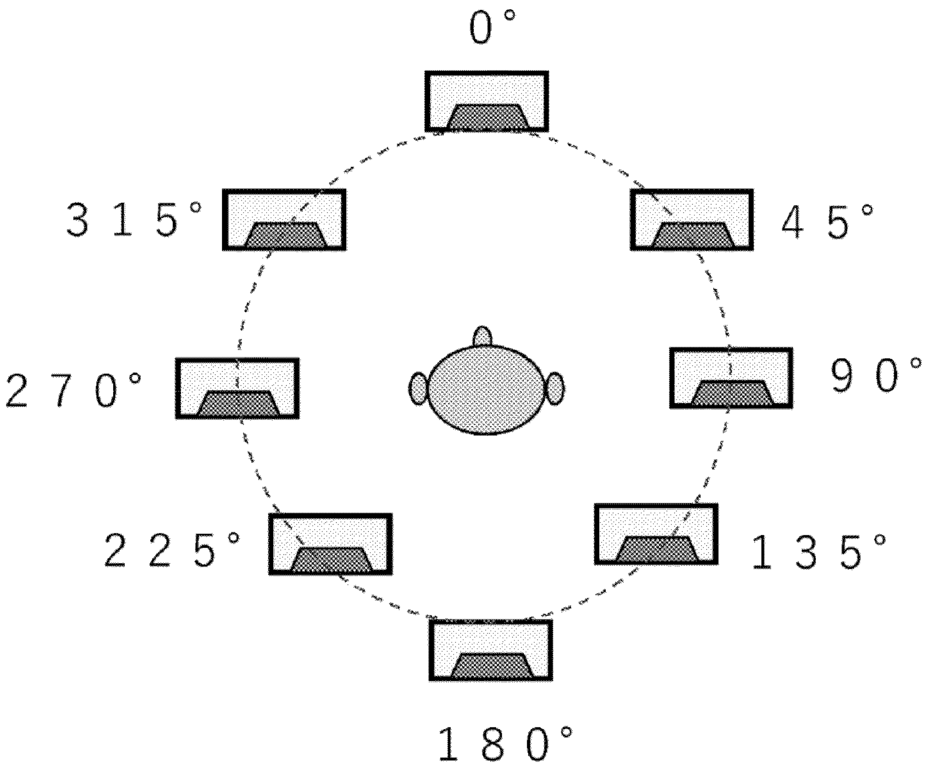

FIGS. 21A and 21B show an example in a case where the position of the guitar amplifier (GUITAR POSITION: $Y_G$) and an angle C of the cabinet (CABINET DIRECTION) are operated using the operation screens 41 and 42. FIG. 21A shows a case where the angle C is fixed to 0 at all times regardless of the value of $Y_G$ (FIG. 22A). In this case, a listener (user) always feels as if the guitar amplifier is facing the front. In this manner, the processor 201 applies an effect of simulating a case where a first musical sound is output from a cabinet speaker with the front facing the user, regardless of a position at which a sound image of the first musical sound is localized.

FIG. 21B shows a case where setting for conforming the angle C to the value of $Y_G$ is performed. In this case, the guitar amplifier faces the back side of the user at all times, and a band member behind the user feels as if the guitar amplifier faces the front at all times.

In the setting related to FIG. 21B, the CPU 31 may perform processing so that any one of the angle C and the angle $Y_G$ is updated to the same value as that of the other in a case where the angle is updated, and the updated angle C and $Y_G$ are transmitted to the headphone 10.

Figure 23:
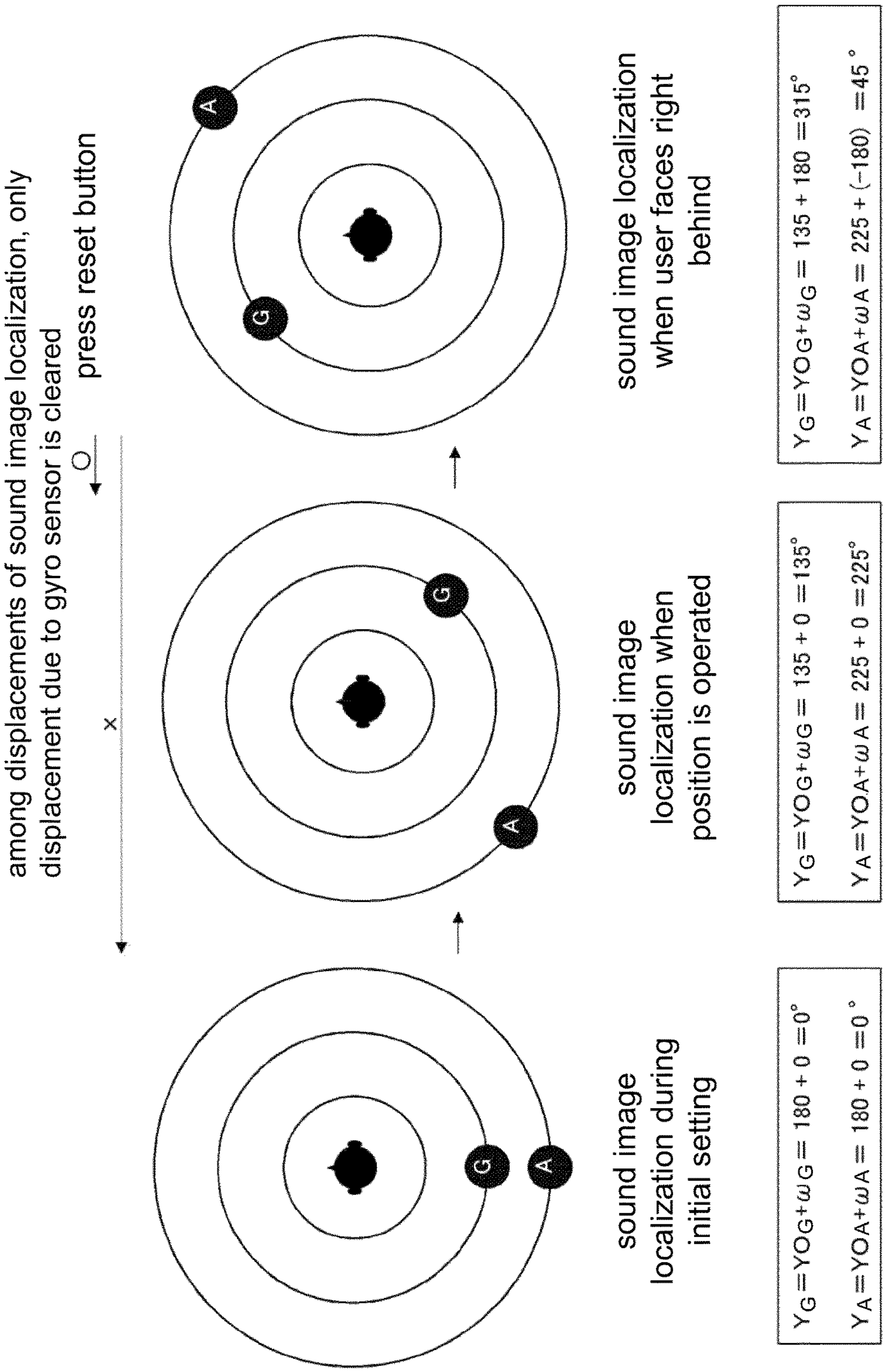
FIG. 23 is a diagram showing operations according to an embodiment.

FIG. 23 is a diagram showing operations according to an embodiment of a stage mode. The left drawing in FIG. 23 shows initial states of an angle $Y_G$ between a guitar amplifier G and a user and an angle $Y_A$ between an audio A and the user. In this example, $Y_G$ and $Y_A$ are both 180 degrees and are positioned right behind the user. Meanwhile, a triple concentric circle indicates distances (small, medium, large) from the user.

As shown in the middle of FIG. 23, the user can set the angles $Y_G$ and $Y_A$ using the operation screen 42. In this example, the angle $Y_G$ is set to 135 degrees, and the angle $Y_A$ is set to 225 degrees.

Thereafter, as shown in the right drawing in FIG. 23, when the user faces right behind, the angle $Y_G$ is changed to 315 degrees, and the angle $Y_A$ is changed to 45 degrees in the stage mode. That is, the guitar amplifier and the audio do not move, and a listening feeling in a case where only the user faces right behind is obtained.

Here, a case where the user performs a reset operation such as the pressing of a reset button of the headphone 10 is assumed. In this case, the processor 201 may return the values of the angles $Y_G$ and $Y_A$ to the values in the initial state to set a state shown on the left side. Values in the initial state may be notified in advance by the terminal 3 or set in the headphone 10 in advance. Alternatively, the processor 201 may erase an angle displacement $\Delta\omega$ to return the state to the state in the middle drawing.

Figure 24:
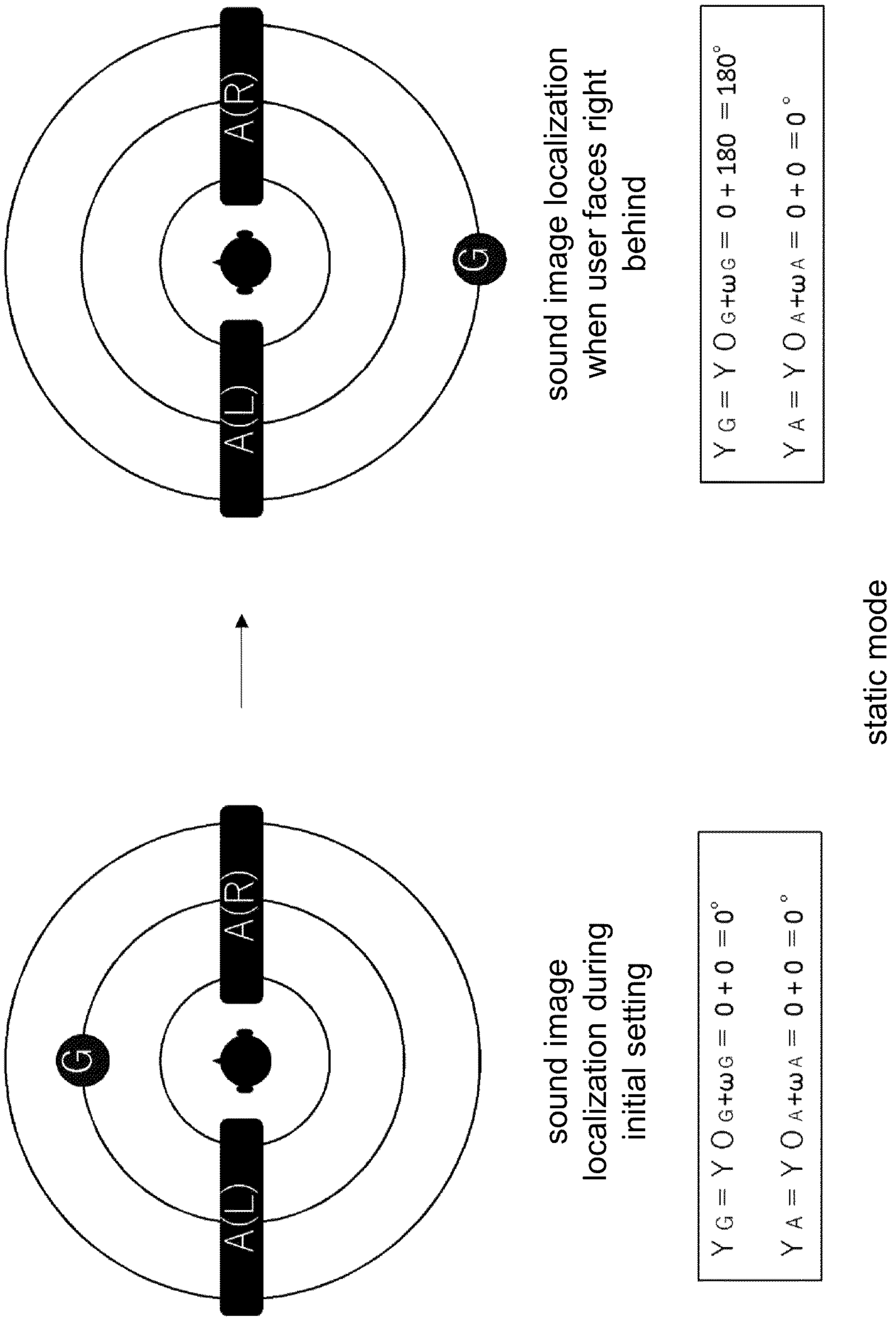
FIG. 24 is a diagram showing operations according to an embodiment.

FIG. 24 is a diagram showing operations according to an embodiment. In a static mode, the processor 201 adjusts panning (right and left volumes) in accordance with a change in the orientation of the user's head. Further, in the static mode, the angle $Y_G$ of the guitar amplifier changes depending on the orientation of the user's head. In the example of FIG. 24, when the user faces right behind, the angle $Y_G$ changes to 180 degrees, and a listening feeling in which a sound from the guitar amplifier is heard from right behind is obtained. According to the embodiment, it is possible to provide the headphone 10 capable of controlling a position at which a sound image of each of first and second musical sounds to be mixed is localized. The configurations shown in the embodiments can be appropriately combined with each other without departing from the object.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of controlling sound signals for mixing a backing sound and a guitar sound, the method comprising configuring a user terminal to:

receive a first input instruction selected from a plurality of available input instructions, where the plurality of available input instructions include a first instruction to transmit a signal of the backing sound;

provide the signal of the backing sound to a wireless communication device in response to the first input instruction being the first instruction to transmit the signal of the backing sound; and control the wireless communication device to convert the signal of the backing sound to a first wireless signal and transmit the first wireless signal to a sound output device for mixing the signal of the backing sound and a signal of the guitar sound provided from the sound output device.

2. The method according to claim 1, wherein the user terminal is further configured to: apply a guitar effect process to the signal of the guitar sound by a processor of the wireless communication device before mixing the signal of the guitar sound and the signal of the backing sound by the processor.

3. The method according to claim 2, wherein the guitar effect process is performed according to an instruction caused by an operator of the wireless communication device.

4. The method according to claim 2, wherein the guitar effect process is a process for simulating resonance in a cabinet of a guitar amplifier on a basis of an impulse response.

5. The method according to claim 1, wherein the wireless communication device comprises:

a first processor configured to mix the signal of the backing sound and the signal of the guitar sound and convert a mixed signal of the backing sound and the guitar sound to a simulation signal; and a headphone amplifier configured to output the simulation signal to a headphone.

6. The method according to claim 1, wherein the plurality of available input instructions are instructions caused by a touch panel.

7. The method according to claim 1, wherein the user terminal is further configured to:

receive a second input instruction selected from the plurality of available input instructions, where the plurality of available input instructions include a second instruction to transmit an effect information related to the signal of the guitar sound;

provide the effect information to the wireless communication device in response to the second input instruction being the second instruction to transmit the effect information;

control the wireless communication device to convert the effect information to a second wireless signal and transmit the second wireless signal to the sound output device for processing the signal of the guitar sound provided form the sound output device.

8. The method according to claim 7, wherein the user terminal is further configured to: apply a guitar effect process to the signal of the guitar sound by a processor of the wireless communication device before mixing the signal of the guitar sound and the signal of the backing sound by the processor.

9. The method according to claim 7, wherein the guitar effect process is performed according to an instruction caused by an operator of the wireless communication device.

10. The method according to claim 7, wherein the wireless communication device comprises:

a first processor configured to mix the signal of the backing sound and the signal of the guitar sound and convert a mixed signal of the backing sound and the guitar sound to a simulation signal; and a headphone amplifier configured to output the simulation signal to a headphone.

11. A user terminal configured to mix a backing sound and a guitar sound, comprising:

an input device configured to receive a first input instruction selected from a plurality of available input instructions, where the plurality of available input instructions include a first instruction to transmit a signal of the backing sound;

a wireless communication device, connected to the input device;

a sound source configured to provide the signal of the backing sound to the wireless communication device in response to the first input instruction being the first instruction to transmit the signal of the backing sound; and a central control unit, configured to control the wireless communication device to convert the signal of the backing sound to a first wireless signal and transmit the first wireless signal to a sound output device for mixing the signal of the backing sound and a signal of the guitar sound provided from the sound output device.

12. The user terminal according to claim 11, wherein the wireless communication device further comprises an effector configured to apply a guitar effect process to the signal of the guitar sound before mixing the signal of the guitar sound and the signal of the backing sound.

13. The user terminal according to claim 12, wherein the wireless communication device further comprises an operator configured to perform the guitar effect process based on an instruction caused by the operator.

14. The user terminal according to claim 12, wherein the guitar effect process is a process for simulating resonance in a cabinet of a guitar amplifier on a basis of an impulse response.

15. The user terminal according to claim 11, wherein the wireless communication device further comprises:

a first processor configured to mix the signal of the backing sound and the signal of the guitar sound and convert a mixed signal of the backing sound and the guitar sound to a simulation signal; and a headphone amplifier configured to output the simulation signal to a headphone.

16. The user terminal according to claim 11, wherein the input device is further configured to receive a second input instruction selected from the plurality of available input instructions, where the plurality of available input instructions include a second instruction to transmit an effect information related to the signal of the guitar sound, the sound source is further configured to provide the effect information to the wireless communication device in response to the second input instruction being the second instruction to transmit the effect information, and the central control unit is configured to control the wireless communication device to convert the effect information to a second wireless signal and transmit the second wireless signal to the sound output device for processing the signal of the guitar sound provided form the sound output device.

17. The user terminal according to claim 16, wherein the wireless communication device further comprises an effector configured to: apply a guitar effect process to the signal of the guitar sound before mixing the signal of the guitar sound and the signal of the backing sound.

18. The user terminal according to claim 16, wherein the wireless communication further comprises an operator configured to perform the guitar effect processing based on an instruction caused by the operator.

19. The user terminal according to claim 16, wherein the wireless communication device further comprises:

a first processor configured to mix the signal of the backing sound and the signal of the guitar sound and convert a mixed signal of the backing sound and the guitar sound to a simulation signal; and a headphone amplifier configured to output the simulation signal to a headphone.

* * * * *